United States Patent
Jain et al.

(10) Patent No.: US 9,325,748 B2
(45) Date of Patent: Apr. 26, 2016

(54) CHARACTERIZING SERVICE LEVELS ON AN ELECTRONIC NETWORK

(71) Applicant: Microsoft Corporation, Redmond, WA (US)

(72) Inventors: Navendu Jain, Seattle, WA (US); Rahul Potharaju, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 13/677,302

(22) Filed: Nov. 15, 2012

(65) Prior Publication Data

US 2014/0136684 A1 May 15, 2014

(51) Int. Cl.
 *H04L 29/06* (2006.01)
 *H04L 12/24* (2006.01)

(52) U.S. Cl.
 CPC ............ *H04L 65/40* (2013.01); *H04L 41/0604* (2013.01); *H04L 41/069* (2013.01); *H04L 41/0631* (2013.01); *H04L 41/5035* (2013.01); H04L 41/0213 (2013.01); H04L 41/064 (2013.01); H04L 41/065 (2013.01); H04L 41/0622 (2013.01); H04L 41/0663 (2013.01); H04L 41/0686 (2013.01); H04L 41/14 (2013.01); H04L 41/5016 (2013.01); H04L 41/5074 (2013.01); H04L 63/1425 (2013.01)

(58) Field of Classification Search
 CPC ............ H04L 41/5016; H04L 41/5019; H04L 41/069; H04L 41/0826
 See application file for complete search history.

(56) References Cited

U.S. PATENT DOCUMENTS

| | | |
|---|---|---|
| 4,816,994 A | 3/1989 | Freiling et al. |
| 5,483,637 A | 1/1996 | Winokur et al. |
| 6,118,936 A | 9/2000 | Lauer et al. |
| 6,131,112 A | 10/2000 | Lewis et al. |
| 6,249,755 B1 | 6/2001 | Yemini et al. |
| 6,353,902 B1 | 3/2002 | Kulatunge et al. |
| 6,742,141 B1 | 5/2004 | Miller |

(Continued)

FOREIGN PATENT DOCUMENTS

| | | |
|---|---|---|
| EP | 2037625 A1 | 3/2009 |
| WO | 97/24839 A2 | 7/1997 |

(Continued)

OTHER PUBLICATIONS

Spanning Tree Protocol Root Guard Enhancement, Retrieved at <<http://www.cisco.com/application/pdf/paws/10588/74.pdf>>, Retrieved Date: Feb. 15, 2012, pp. 6.

(Continued)

*Primary Examiner* — Brian J Gillis
*Assistant Examiner* — Steve Lin
(74) *Attorney, Agent, or Firm* — Sandy Swain; Micky Minhas

(57) ABSTRACT

The described implementations relate to processing of electronic data. One implementation is manifest as a system that that can include an event analysis component and one or more processing devices configured to execute the event analysis component. The event analysis component can be configured to obtain events from event logs, the events reflecting failures by one or more network devices in one or more data centers and characterize a service level of an application or a network device based on the events. For example, the event analysis component can be configured to characterize the availability of an application based on one or more network stamps of the application.

20 Claims, 11 Drawing Sheets

(56) References Cited

U.S. PATENT DOCUMENTS

| | | | |
|---|---|---|---|
| 6,785,226 B1 | 8/2004 | Oltman et al. | |
| 6,829,734 B1 | 12/2004 | Kreulen et al. | |
| 7,010,593 B2 | 3/2006 | Raymond | |
| 7,039,827 B2* | 5/2006 | Meyer et al. | 714/4.11 |
| 7,047,291 B2 | 5/2006 | Breese et al. | |
| 7,085,697 B1 | 8/2006 | Rappaport et al. | |
| 7,209,923 B1 | 4/2007 | Cooper | |
| 7,246,159 B2 | 7/2007 | Aggarwal et al. | |
| 7,313,736 B2 | 12/2007 | Scrandis et al. | |
| 7,315,887 B1 | 1/2008 | Liang et al. | |
| 7,451,210 B2 | 11/2008 | Gupta et al. | |
| 7,539,907 B1 | 5/2009 | Johnsen et al. | |
| 7,565,661 B2 | 7/2009 | Sim-Tang | |
| 7,580,956 B1 | 8/2009 | Xin et al. | |
| 7,596,083 B2 | 9/2009 | Klos et al. | |
| 7,813,298 B2 | 10/2010 | Lidstrom et al. | |
| 7,853,544 B2 | 12/2010 | Scott et al. | |
| 7,965,620 B2 | 6/2011 | Gadgil et al. | |
| 7,995,485 B1 | 8/2011 | Anderson et al. | |
| 8,032,489 B2 | 10/2011 | Villella et al. | |
| 8,046,637 B2 | 10/2011 | Gross et al. | |
| 8,112,667 B2 | 2/2012 | Belluomini et al. | |
| 8,135,995 B2 | 3/2012 | Ngai et al. | |
| 8,161,325 B2 | 4/2012 | Calman et al. | |
| 8,169,921 B2 | 5/2012 | Yang et al. | |
| 8,195,692 B2 | 6/2012 | Baek et al. | |
| 8,260,893 B1 | 9/2012 | Bandhole et al. | |
| 8,738,968 B2 | 5/2014 | Kanso et al. | |
| 8,838,599 B2 | 9/2014 | Xu et al. | |
| 8,862,948 B1 | 10/2014 | Lam | |
| 8,892,550 B2 | 11/2014 | Chu-Carroll et al. | |
| 8,892,960 B2 | 11/2014 | Sambamurthy et al. | |
| 8,996,539 B2 | 3/2015 | Agrawal et al. | |
| 9,065,730 B2 | 6/2015 | Craig et al. | |
| 9,183,184 B2 | 11/2015 | Verma et al. | |
| 9,201,955 B1 | 12/2015 | Quintao et al. | |
| 2002/0124214 A1 | 9/2002 | Ahrens et al. | |
| 2002/0156817 A1 | 10/2002 | Lemus | |
| 2002/0161873 A1 | 10/2002 | McGuire | |
| 2002/0174384 A1 | 11/2002 | Graichen et al. | |
| 2003/0023719 A1 | 1/2003 | Castelli et al. | |
| 2003/0034995 A1 | 2/2003 | Osborn et al. | |
| 2003/0046615 A1 | 3/2003 | Stone | |
| 2003/0093481 A1 | 5/2003 | Mitchell et al. | |
| 2003/0110408 A1* | 6/2003 | Wells et al. | 714/1 |
| 2003/0123446 A1 | 7/2003 | Muirhead et al. | |
| 2003/0172046 A1 | 9/2003 | Scott | |
| 2004/0088386 A1 | 5/2004 | Aggarwas | |
| 2004/0225952 A1 | 11/2004 | Brown et al. | |
| 2005/0138170 A1 | 6/2005 | Cherkasova et al. | |
| 2005/0138486 A1 | 6/2005 | Gromyko | |
| 2005/0154690 A1 | 7/2005 | Nitta et al. | |
| 2005/0171948 A1 | 8/2005 | Knight | |
| 2005/0181835 A1 | 8/2005 | Lau et al. | |
| 2005/0188240 A1* | 8/2005 | Murphy et al. | 714/4 |
| 2005/0222811 A1 | 10/2005 | Jakobson et al. | |
| 2005/0276217 A1 | 12/2005 | Gadgil et al. | |
| 2006/0179432 A1 | 8/2006 | Walinga et al. | |
| 2006/0218267 A1* | 9/2006 | Khan et al. | 709/224 |
| 2007/0028139 A1 | 2/2007 | Wahl et al. | |
| 2007/0192406 A1 | 8/2007 | Frietsch et al. | |
| 2008/0016412 A1 | 1/2008 | White et al. | |
| 2008/0077682 A1 | 3/2008 | Nair et al. | |
| 2009/0055684 A1 | 2/2009 | Jamjoom et al. | |
| 2009/0063387 A1 | 3/2009 | Beaty et al. | |
| 2009/0138306 A1 | 5/2009 | Coburn et al. | |
| 2009/0183030 A1 | 7/2009 | Bethke et al. | |
| 2009/0262650 A1* | 10/2009 | Shaikh et al. | 370/242 |
| 2010/0049590 A1 | 2/2010 | Anshul | |
| 2010/0100775 A1 | 4/2010 | Slutsman et al. | |
| 2010/0124165 A1 | 5/2010 | Yang et al. | |
| 2010/0125745 A1 | 5/2010 | Kogan et al. | |
| 2010/0131952 A1* | 5/2010 | Akiyama et al. | 718/100 |
| 2010/0138688 A1 | 6/2010 | Sykes et al. | |
| 2010/0189113 A1 | 7/2010 | Csaszar et al. | |
| 2010/0218104 A1 | 8/2010 | Lewis | |
| 2010/0287403 A1 | 11/2010 | Jenkins | |
| 2010/0302940 A1 | 12/2010 | Patel et al. | |
| 2010/0332911 A1 | 12/2010 | Ramananda et al. | |
| 2011/0087522 A1 | 4/2011 | Beaty et al. | |
| 2011/0153539 A1 | 6/2011 | Rojahn | |
| 2011/0191623 A1 | 8/2011 | Dennert | |
| 2011/0239050 A1 | 9/2011 | Malisetti et al. | |
| 2011/0276836 A1 | 11/2011 | Kahana et al. | |
| 2011/0289076 A1 | 11/2011 | Boyle et al. | |
| 2011/0313962 A1 | 12/2011 | Jones et al. | |
| 2012/0136971 A1 | 5/2012 | Cherkasova et al. | |
| 2012/0185582 A1 | 7/2012 | Graessley | |
| 2012/0185735 A1 | 7/2012 | Sambamurthy et al. | |
| 2012/0213081 A1 | 8/2012 | Imai | |
| 2012/0213227 A1 | 8/2012 | Jaeger | |
| 2012/0218104 A1* | 8/2012 | Lai | 340/540 |
| 2012/0245924 A1 | 9/2012 | Brun | |
| 2012/0290715 A1 | 11/2012 | Dinger et al. | |
| 2013/0097304 A1 | 4/2013 | Asthana et al. | |
| 2013/0138419 A1 | 5/2013 | Lopez et al. | |
| 2013/0204808 A1 | 8/2013 | Jiang et al. | |
| 2013/0226525 A1 | 8/2013 | Marwah et al. | |
| 2013/0227115 A1* | 8/2013 | Hobbs et al. | 709/224 |
| 2013/0286852 A1 | 10/2013 | Bowler et al. | |
| 2013/0290783 A1 | 10/2013 | Bowler et al. | |
| 2013/0291034 A1 | 10/2013 | Basile et al. | |
| 2013/0332145 A1 | 12/2013 | Bostick et al. | |
| 2013/0332399 A1 | 12/2013 | Reddy et al. | |
| 2014/0006861 A1 | 1/2014 | Jain et al. | |
| 2014/0047271 A1 | 2/2014 | Gray et al. | |
| 2014/0136690 A1 | 5/2014 | Jain | |
| 2014/0325019 A1 | 10/2014 | Austin et al. | |
| 2015/0006519 A1 | 1/2015 | Jain et al. | |
| 2015/0032500 A1 | 1/2015 | Cope et al. | |
| 2015/0221109 A1 | 8/2015 | Klein et al. | |
| 2015/0271192 A1 | 9/2015 | Crowley | |
| 2015/0302094 A1 | 10/2015 | Bobick et al. | |
| 2015/0317301 A1 | 11/2015 | Liang et al. | |

FOREIGN PATENT DOCUMENTS

| | | |
|---|---|---|
| WO | 9847265 A1 | 10/1998 |
| WO | 2014/078592 A2 | 5/2014 |
| WO | 2014/078668 A2 | 5/2014 |

OTHER PUBLICATIONS

Greenberg, et al., "Towards a Next Generation Data Center Architecture: Scalability and Commoditization", Retrieved at <<http://research.microsoft.com/pubs/79348/presto27-greenberg.pdf>>, Proceedings of the ACM Workshop on Programmable Routers for Extensible Services of Tomorrow, Aug. 22, 2008, pp. 57-62.

Guo, et al., "DCell: A Scalable and Fault-Tolerant Network Structure for Data Centers", Retrieved at <<http://research.microsoft.com/pubs/75988/dcell.pdf>>, In Proceedings of the ACM SIGCOMM Conference on Data Communication, Aug. 17, 2008, pp. 75-86.

Gyarmati, et al., "Scafida: A Scale-Free Network Inspired Data Center Architecture", Retrieved at <<http://ccr.sigcomm.org/drupal/files/p5-2v40n5b2-gyarmatiPS.pdf>>, In ACM SIGCOMM Computer Communication Review, vol. 40, Issue 5, Oct. 2010, pp. 4-12.

Wang, et al., "MCube A High Performance and Fault-Tolerant Network Architecture for Data Centers", Retrieved at <<http://ieeexplore.ieee.org/stamp/stamp.jsp?tp=&arnumber=5540940>>, 2010 International Conference on Computer Design and Applications, Jun. 25, 2010, pp. 423-427.

"ABI. Enterprise Network and Data Security Spending Shows Remarkable Resilience", Retrieved at <<http://goo gl/t43ax, Jan. 2011, pp. 5.

Allman, Mark, "On the Performance of Middleboxes", Retrieved at <<http://citeseerx.ist.psu.edu/viewdoc/download?doi=10.1.1.77.9560&rep=rep1&type=pdf>>, In Procs. of Sigcomm IMC. ACM, 2003, pp. 6.

Biggadike, et al., "NATBLASTER: Establishing TCP Connections Between Hosts Behind NATs", Retrieved at <<http://sparrow.ece.cmu.edu/~adrian/projects/natblaster.pdf>>, In ACM Sigcomm Workshop, 2005, pp. 10.

(56) References Cited

OTHER PUBLICATIONS

Carpenter, et al, "Middleboxes: Taxonomy and issues", Retrieved at << http://goo.gl/EhJKw>>, Feb. 2002, pp. 28.
Casado, et al., "Ethane: Taking Control of the Enterprise", Retrieved at <<http://yuba.stanford.edu/~casado/ethane-sigcomm07.pdf>>, ACM Sigcomm CCR, 2007, pp. 12.
Case, et al., "A Simple Network Management Protocol", Retrieved at <<http://goo.gl/az3Fv>>, May 1990, pp. 34.
Eppinger, Jeffrey L., "TCP Connections for P2P Apps: A Software Approach to Solving the NAT Problem.", Retrieved at <<http://reports-archive.adm.cs.cmu.edu/anon/isri2005/CMU-ISRI-05-104.pdf>>, ISR, 2005, pp. 8.
Gill, et al., "Understanding network failures in data centers: measurement, analysis, and implications", Retrieved at <<http://www.cs.uccs.edu/~zbo/teaching/CS522/Projects/SIGCOMM11-DCFailure.pdf>>, In Proc. of Sigcomm, 2011, pp. 350-361.
Greenberg, et al., "Vl2: a scalable and flexible data center network", Retrieved at <<http://www.cs.cmu.edu/afs/.cs.cmu.edu/Web/People/prs/15-744-F11/papers/vl2.pdf>>, ACM Sigcomm CCR, 2009, pp. 12.
Greenberg, et al., "A Clean Slate 4D Approach to Network Control and Management", Retrieved at <<http://www.cs.cmu.edu/~4d/papers/greenberg-ccr05.pdf>>, ACM Sigcomm CCR, 2005, pp. 12.
Guo, et al., "BCube: A High Performance, Server-Centric Network Architecture for Modular Data Centers", Retrieved at <<http://research.microsoft.com/pubs/81063/comm136-guo.pdf>>, In ACM Sigcomm CCR, 2009, pp. 12.
Hancock, et al., "Next Steps in Signaling (NSIS): Framework", Retrieved at <<http://cabernet.tools.ietf.org/pdf/rfc4080.pdf>>, 2005, pp. 50.
Johnson, D., "NOC Internal Integrated Trouble Ticket System", Retrieved at <<http://goo.gl/eMZxX>>, Jan. 1992, pp. 13.
Joseph, et al., "A Policy-aware Switching Layer for Data Centers", Retrieved at <<http://ccr.sigcomm.org/drupal/files/p51-josephA.pdf>>, In ACM Sigcomm CCR, 2008, pp. 12.
Kalchschmidt, et al., "Inventory management in a multi-echelon spare parts supply chain", Retrieved at <<http://read.pudn.com/downloads142/sourcecode/others/617477/inventory%20supply%20chain/04051312322413213(1).pdf>>, Journal of Production Economics, 2003, pp. 397-413.
Kandula, et al., "Detailed Diagnosis in Enterprise Networks", Retrieved at <<http://ccr.sigcomm.org/online/files/p243.pdf>>, In ACM Sigcomm CCR, 2009, pp. 243-254.
Labovitz, et al., "Experimental Study of Internet Stability and Backbone Failures", Retrieved at <<http://ieeexplore.ieee.org/stamp/stamp.jsp?tp=&arnumber=781062>>, In Fault-Tolerant Computing,1999. IEEE, 1999, pp. 8.
Lockwood, John W., "An Open Platform for Development of Network Processing Modules in Reprogrammable Hardware", Retrieved at <<http://algo-logic.com/~jwlockwd/publications/designcon2001_fpx_platform.pdf>>, IEC DesignConaA 'Z01, 2001, pp. 1-10.
Markopoulou, et al., "Characterization of Failures in an IP Backbone", Retrieved at <<http://ieeexplore.ieee.org/stamp/stamp.jsp?tp=&arnumber=4456903>>, IEEE/ACM Transactions on Networking, vol. 16, No. 4, Aug. 2008, pp. 749-762.
McCloghrie, et al., "Management Information Base for Network Management of TCP/IP-based internets", Retrieved at <<http://goo.gl/n4gyR>>, Mar. 1991, pp. 66.
Mudigonda, et al., "NetLord: A Scalable Multi-Tenant Network Architecture for Virtualized Datacenters", Retrieved at <<http://www.hpl.hp.com/personal/Praveen_Yalagandula/papers/SIGCOMM2011-NetLord.pdf>>, In Procs. of ACM Sigcomm. ACM, 2011, pp. 12.
Mysore, et al., "PortLand: A Scalable Fault-Tolerant Layer 2 Data Center Network Fabric", Retrieved at <<http://cseweb.ucsd.edu/~vahdat/papers/portland-sigcomm09.pdf>>, In Procs. of Sigcomm CCR. ACM, 2009, pp. 12.

Padmanabhan, et al., "A Study of End-to-End Web Access Failures", Retrieved at <<http://citeseerx.ist.psu.edu/viewdoc/download?doi=10.1.1.71.4884&rep=rep1&type=pdf>>, In CoNext. ACM, 2006, pp. 13.
Sekar, et al., "The Middlebox Manifesto: Enabling Innovation in Middlebox Deployment", Retrieved at <<http://www.cs.unc.edu/~reiter/papers/2011/HotNets.pdf>>, In Proc. HotNets, 2011, pp. 1-6.
Shaikh, et al., "A Case Study of OSPF Behavior in a Large Enterprise Network", Retrieved at <<http://citeseerx.ist.psu.edu/viewdoc/download?doi=10.1.1.88.8850&rep=rep1&type=pdf>>, In ACM Sigcomm WIM, 2002, pp. 14.
Srisuresh, et al., Middlebox Communication Architecture and Framework, Retrieved at <<http://www.ietf.org/rfc/rfc3303.txt>>, RFC 3303, 2002, pp. 32.
Stiemerling, et al., "Middlebox Communication (MIDCOM) Protocol Semantics", Retrieved at <<http://citeseerx.ist.psu.edu/viewdoc/download?doi=10.1.1.182.7835&rep=rep1&type=pdf>>, RFC 4097, 2008, pp. 70.
Swale, et al., "Middlebox Communications Protocol Requirements", Retrieved at <<http://www.ietf.org/rfc/rfc3304.txt>>, RFC 3304, 2002, pp. 9.
Turner, et al., "California Fault Lines: Understanding the Causes and Impact of Network Failures", Retrieved at <<http://cseweb.ucsd.edu/~ snoeren/papers/cenic-sigcomm10.pdf>>, In ACM Sigcomm CCR, 2010, pp. 12.
Walfish, et al., "Middleboxes No Longer Considered Harmful", Retrieved at <<http://www.usenix.org/event/osdi04/tech/full_papers/walfish/walfish.pdf>>, In Procs. of SOSDI. USENIX Association, 2004, pp. 215-230.
Watson, et al., "Experiences with Monitoring OSPF on a Regional Service Provider Network", Retrieved at <<http://www.eecs.umich.edu/techreports/cse/03/CSE-TR-477-03.pdf>>, In ICDCS. IEEE, 2003, pp. 12.
"I. Week. Data center outages generate big losses", Retrieved at <<http://goo.gl/zBOfv>>, May 2011, pp. 9.
"Method and System for Determining the Impact of Failures in Data Center Networks", U.S. Appl. No. 13/409,111, filed Mar. 1, 2012, pp. 33.
Middlebox Reliability, U.S. Appl. No. 13/536,782, filed Jun. 28, 2012, pp. 61.
"International Search Report & Written Opinion for PCT Patent Application No. PCT/US2013/070188", Mailed Date: May 19, 2014, Filed Date: Nov. 14, 2013, 18 Pages.
Song, et al., "Availability Modeling and Analysis on High Performance Cluster Computing Systems", In The First International Conference on Availability, Reliability and Security, Apr. 20, 2006, 8 Pages.
"A Practitioner's Guide to More Efficient Network Management", Retrieved at <<http://h10124.www1.hp.com/campaigns/us/en/software/images/Practitioners_Guide.pdf>>, Retrieved Date: Feb. 8, 2012, pp. 8.
Abu-Libdeh,et al., "Symbiotic routing in future data centers", Retrieved at <<http://research.microsoft.com/en-us/um/people/antr/publications/sigcomm10-camcube.pdf>>, Proceedings of SIGCOMM, Aug. 30-Sep. 3, 2010, pp. 12.
Al-Fares, et al., "A scalable, commodity data center network architecture", Retrieved at <<http://ccr.sigcomm.org/online/files/p63-alfares.pdf>>, Proceedings of SIGCOMM, Aug. 17-22, 2008, pp. 63-74.
Alizadeh, et al., "Data Center TCP (DCTCP)". Retrieved at <<http://ccr.sigcomm.org/online/files/p63_0.pdf>>, Proceedings of SIGCOMM, Aug. 30-Sep. 3, 2010, pp. 63-74.
Bakkaloglu, M. et al.; "On Correlated Failures in Survivable Storage Systems"; Technical Report CMU-CS-02-129; Carnegie Mellon University; Pittsburgh PA; May 2002; 37 pages.
Bansal, N. et al.; "Towards Optimal Resource Allocation in Partial-Fault Tolerant Applications"; Infocom; 2008; 10 pages.
Benson, et al., "Network traffic characteristics of data centers in the wild", Retrieved at <<http://conferences.sigcomm.org/imc/2010/papers/p267.pdf>>, Proceedings of IMC, Nov. 1-3, 2010, pp. 267-280.
Benson, et al., "A first look at problems in the cloud", Retrieved at <<http://www.usenix.org/events/hotcloud10/tech/full_papers/Benson.pdf>>, Proceedings of Hot Cloud, 2010, pp. 1-7.

(56) References Cited

OTHER PUBLICATIONS

"Better Predict and Prevent Network Failure—Monolith Software for Network Management", Retrieved at <<http://www.monolith-software.com/solutions/network-management.php>>, Retrieved Date: Oct. 19, 2011, pp. 2.

Brodkin, Jon, "Amazon EC2 outage calls 'availability zones' into question", Retrieved at <<http://www.networkworld.com/news/2011/042111-amazon-ec2-zones.html>>, Apr. 21, 2011, pp. 8.

Chen, et al., "Declarative configuration management for complex and dynamic networks", Retrieved at <<http://www2.research.att.com/~kobus/docs/coolaid.pdf>>,Proceedings of CoNEXT, Nov. 30-Dec. 3, 2010, pp. 12.

"Cisco: Data center: Load balancing data center services", Retrieved at <<http://www.cisco.com/en/US/solutions/collateral/ns340/ns517/ns224/ns668/>>, Mar. 2004, pp. 94.

"Cisco. UniDirectional Link Detection (UDLD)", Retrieved at <<http://www.cisco.com/en/US/tech/tk866/tsd_technology_support_sub-protocol_home.html>>, pp. 2.

Ellram, L. et al.; "Total Cost of Ownership: A Key Concept in Strategic Cost Management Decisions"; Journal of Business Logistics; vol. 19, No. 1;1998; pp. 55-84.

"EMC Ionix Application Discovery Manager", Retrieved at <<http://www.emc.com/collateral/software/data-sheet/h2365-ionix-adm-ds.pdf>>, Proceedings of ICIDS 2008, Retrieved Date: Oct. 19, 2011, pp. 5.

"Enterprise Network and Data Security Spending Shows Remarkable Resilience", Retrieved at <<http://www.abiresearch.com/press/3591-Enterprise+Network+and+Data+Security+Spending+Shows+Remarkable+Resilience>>, Jan. 2011, pp. 5.

Ford, et al., "Availability in globally distributed storage systems", Retrieved at <<http://www.usenix.org/event/osdi10/tech/full_papers/Ford.pdf>>, Proceedings of OSDI, 2010, pp. 1-14.

Guo, et al., "DCell: A scalable and fault-tolerant network structure for data centers", Retrieved at <<http://lcs.syr.edu/faculty/tang/Teaching/CSE791-Spring11/Papers/VL2-Sigcomm09.pdf>>, Proceedings of 2008, Aug. 17-22, 2008, pp. 75-86.

Harris, Chandler., "Data Center Outages Generate Big Losses", Retrieved at <<http://www.informationweek.com/news/hardware/data_centers/229500121>>, May 12, 2011, pp. 9.

Kececioglu, D.; "Maintainability, availability, and operational readiness engineering handbook"; vol. 1; DEStech Publications, Inc.; 2002; pp. 24 and 27-29.

Kim, et al., "Floodless in Seattle: a scalable ethernet architecture for large enterprises", Retrieved at <<http://www.cs.princeton.edu/courses/archive/fall10/cos561/papers/Seattle08.pdf>>, Proceedings of SIGCOMM, Aug. 17-22, 2008, pp. 12.

McKeown, et al., "Openflow: enabling innovation in campus networks", Retrieved at <<http://www.cs.illinois.edu/~pbg/courses/cs598fa10/readings/mabpprst08.pdf>>, Proceedings of SIGCOMM CCR, Mar. 14, 2008, pp. 6.

Meykar, O.; "Definitions of Effectiveness Terms: A Report on the Purpose and Contents of MIL-STD-721B"; IEEE Transactions on Aerospace and Electronic Systems; vol. AES3, No. 2; Mar. 1967; pp. 165-170.

MIL-STD-721C; Jun. 12, 1981; Department of Defense, Washington, D.C.; 18 pages.

O'Connor, P et al.; "Practical Reliability Engineering"; Wiley & Sons; 2012, pp. 1, 147 and 431.

Schroeder, et al., "Disk failures in the real world: What does an MTTF of 1,000,000 hours mean to you?", Retrieved at <<http://www.usenix.org/event/fast07/tech/schroeder/schroeder.pdf>>, Proceedings of FAST '07: 5th USENIX Conference on File and Storage Technologies, pp. 1-16.

Schroeder, et al., "DRAM errors in the wild: A large-scale field study", Retrieved at <<http://edpin.com/dram_sigmetrics09.pdf>>, Proceedings of SIGMETRICS, Jun. 15-19, 2009, pp. 12.

"Security Information & Event Manager (SIEM)", Retrieved at <<http://www.enterasys.com/company/literature/siem-ds.pdf>>, Retrieved Date: Oct. 19, 2011, pp. 7.

Singh, et al., "DYSWIS: An Architecture for Automated Diagnosis of Networks", Retrieved at <<http://www.cs.columbia.edu/~vs2140/DYSWIS.pdf>>, May 1-10, 2011, pp. 8.

Tang, D. et al.; "Analysis and Modeling of Correlated Failures in Multicomputer Systems"; IEEE Transactions on Computers; vol. 41, No. 5; May 1992; 11 pages.

Thottan, et al., "Anomaly Detection in IP Networks", Retrieved at <<http://users.ece.gatech.edu/jic/sig03.pdf>>, Proceedings of IEEE Transactions on Signal Processing, vol. 51, No. 8, Aug. 2003, pp. 2191-2204.

Vishwanath, et al., "Characterizing cloud computing hardware reliability", Retrieved at <<http://research.microsoft.com/pubs/120439/socc088-vishwanath.pdf>>, Proceedings of Symposium on Cloud Computing (SOCC), Jun. 10-11, 2010, pp. 11.

Wundsam, et al., "OFRewind: Enabling Record and Replay Troubleshooting for Networks", Retrieved at <<http://www.usenix.org/event/atc11/tech/final_files/Wundsam.pdf>>, USENIXATC'11 Proceedings of the 2011 USENIX conference on USENIX annual technical conference, 2011, pp. 1-14.

"Second Written Opinion from the International Preliminary Examining Authority" from PCT/US2013/070327, Mailed Oct. 29, 2014, 11 pages.

"International Search Report" from Application No. PCT/US2013/070327 Mailed May 15, 2014, 21 pages.

"Response to International Search Report & Written Opinion dated Mar. 28, 2014," from PCT Patent Application No. PCT/US2013/070327, Filed Sep. 5, 2014, 9 pages.

"International Preliminary Report on Patentability," from PCT Patent Application No. PCT/US2013/070327, Mailed Date: Feb. 19, 2015, 12 pages.

"Notice of Allowance," from U.S. Appl. No. 13/536,782, Mailed Date: Feb. 17, 2015, 6 pages.

"Microsoft Assesment and Planning Toolkit", Retrieved at <<http://www.microsoft.com/sam/en/us/map.aspx>> Sep. 23, 2010. 2 Pages.

Cisco Systems Inc., "Network Management System", White Paper on Network Management Best System Practices, Aug. 9, 2003. Retrieved at http://www.cisco.com/c/en/us/support/docs/availability/high-availability/15114-NMS-bestpractice.html#invento%E2%80%A6. 17 Pages.

"Demystifying the Dark Side of the Middle: A Field Study of Middlebox Failures in Datacerners", Rahul Ptharaju and Navendu Jain, IMC '13, Oct. 23-25, 2013, Barcelona, Span. ACM 2013. 14 Pages.

Sherry et al., "Making Middleboxes Someone Else's Problem: Network Processing As a Cloud Service," in SIGCOMM, Sep. 24, 2012. 12 Pages.

"Why Gmail went down: Google misconfigured load balancing servers," Online Retrieved From Why Gmail went down: Google misconfigured load balancing servers (Updated). Dec. 11, 2012. 4 Pages.

Sekar et al., "Design and Implementation of a Consolidated Middlebox Architecture," in NSDI, Apr. 25-27, 2012. 14 Pages.

Uppal et al., "ETTM: A Scalable Fault Tolerant NetworkManager," in NSDI, Mar. 30-Apr. 1, 2011. 14 Pages.

Greenhalgh et al., "Flow Processing and the Rise of Commodity Network Hardware," ACM SIGCOMM Computer Communication Review, vol. 39, No. 2, Apr. 2009. 7 Pages.

Liu et al., "F10: Fault-Tolerant Engineered Networks," USENIX Association 10th USENIX Symposium on Networked Systems Design and Implementation, NSDI, Apr. 3-5, 2013. 14 Pages.

Wang ta l., "An Untold Story of Middleboxes in Cellular Networks," SIGCOMM'11, Aug. 15-19, 2011, Toronto, Ontario, Canada. 13 Pages.

Mann et al., "On a Test of Whether One of Two Random Variables is Stochastically Larger than the Other," in The Annals of Mathematical Statistics, vol. 18, No. 1, Mar. 1947. 11 Pages.

Potharaju et al., "Juggling the Jigsaw: Towards Automated Problem Inference from Network Trouble Tickets," in 10th USENIX Symposium on Networked Systems Design and Implementation, NSDI, Apr. 3-5, 2013. 15 Pages.

C. E. Brown, "Coefficient of Variation," in Applied Multivariate Statistics in Geohydrology and Related Sciences 1998. pp. 155-157.

(56) References Cited

OTHER PUBLICATIONS

Mahimkar et al., "dFence: Transparent network-based denial of service mitigation," 4th USENIX Symposium on Networked Systems Design & Implementation, Apr. 11-13, 2007. 25 Pages.
R. Sakia, "The Box-Cox Transformation Technique: A Review," in The Statistician, Journal of the Royal Statistical Society, Series D, vol. 41, No. 2, 1992. 6 Pages.
T. L. Bailey and C. Elkan, "Fitting a Mixture Model by Expectation Maximization to Discover Motifs in Bipolymers," in ISMB, Aug. 1994. 33 Pages.
H. W. Lilliefors, "On the Kolmogorov-Smirnov Test for Normality with Mean and Variance Unknown," JASA, Jun. 1967. 5 Pages.
Argyraki et al., "Can Software Routers Scale?" in PRESTO'08, Aug. 22, 2008, Seattle, Washington, USA. 6 Pages.
Nedevschi et al., "Reducing Network Energy Consumption via Sleeping and Rate-adaptation," in NSDI '08: 5th USENIX Symposium on Networked Systems Design USENIX Association and Implementation, Aug. 11, 2008. 14 Pages.
Kazemian et al., "Header space analysis: Static checking for networks," in NSDI, Apr. 25, 2012. 14 Pages.
Handigol et al., Where is the debugger for my software-defined network? in Proceedings of the first workshop on Hot topics in software defined networks. HotSDN'12, Aug. 13, 2012, Helsinki, Finland. 6 Pages.
Mai et al., "Debugging the Data Plane with Anteater," SIGCOMM'11, Aug. 15-19, 2011, Toronto, Ontario, Canada. 12 Pages.
Feamster et al., "Detecting BGP configuration Faults with Static Analysis," 2nd Symp. on Networked Systems Design and Implementation (NSDI), Boston, MA, May 2005. 14 Pages.
Feldmann et al., "IP network Configuration for Intra-domain Traffic Engineering," Network, IEEE, Sep./Oct. 2001. 27 Pages.
Hancock et al., "Next steps in signaling (NSIS): Framework," in IETF RFC 4080, Jun. 2005. 46 Pages.
L. Ellram, "Total Cost of Ownership: An Analysis Approach for Purchasing," in Journal of PDLM, 1995. 12 Pages.
Leland et al., "On the Self-Similar Nature of Ethernet Traffic (extended version)," in IEEE ToN, Feb. 1994. 15 Pages.
T. K. Moon, "The Expectation-Maximization Algorithm," Nov. 1996. 14 Pages.
Bendel et al., "Comparison of Skewness Coefficient, Coefficient of Variation, and GiniCoefficient as Inequality Measures within Populations," in Oecologia, vol. 78, Issue 3, Mar. 1989. 7 Pages.
"2011 ADC Security Survey Global Findings," http://www.slideshare.net/f5dotcom/2011-f5-adc-security-survey-global-slideshare. Nov. 4, 2011. 10 Pages.
M. Scharf and A. Ford, "MP-TCP Application Interface Considerations," draft-ietf-mptcp-api-00, Nov. 29, 2010. 10 Pages.
"Cisco Data Center Network Architecture," http://www.cisco.com/c/dam/en/us/solutions/collateral/data-center-virtualization/net_brochure0900aecd80404988.pdf, 2006. 2 Pages.
Law et al., "An Integrated Case-Based Reasoning Approach for Intelligent Help Desk Fault Management", 1997, Expert Systems with Applications, vol. 13, No. 4, pp. 265-274.
Spasic et al., "Text Mining and Ontologies in Biomedicine: Making Sense of Raw Text", Sep. 2005, Briefings in Bioinformatics, vol. 6, No. 3, pp. 239-251.
Behnel, S. et al.; "Cython: C-Extensions for Python"; retrieved at http://cython.org; published 2008; accessed Oct. 31, 2012; 3 pages.
Bos, B, et al.; "Cascading style sheets, level 2 revision 1 CSS 2.1 specification"; W3C working draft; W3C; Jun. 2005; 220 pages.
Fruchterman, T. et al.; "Graph drawing by force-directed placement"; Software: Practice and Experience; vol. 21, No. 1 1; Nov. 1991; pp. 1129-1164.
Gruschke, B.; "Integrated event management: Event Correlation Using Dependency Graphs"; Proceedings of the 9th IFIP/IEEE International Workshop on Distributed Systems: Operations & Management (DSOM 98); 1998; 12 pages.
Heim, I.; "Anaphora and Semantic Interpretation: A Reinterpretation of Reinhart's Approach"; MIT Working Papers in Linguistics 25; 1998; pp. 205-246.
Justeson, J. et al.; "Technical terminology: some linguistic properties and an algorithm for identification in text"; Natural Language Engineering; vol. 1, No. 1; 1995; pp. 9-27.
"N-Gram Extraction Tools"; retrieved at http://goo.gl/VNTJa; accessed on Oct. 31, 2012; 3 pages.
Ziefle, M.; "Effects of display resolution on visual performance"; Human Factors: The Journal of the Human Factors and Ergonomics Society; vol. 40, No. 4; 1998; pp. 554-568.
"Jquery", Retrieved at <<http://jquery.com/>>, Retrieved Date: Aug. 7, 2012, p. 1.
Muehlen, et al., "Developing Web Services Choreography Standards L The Case of REST vs. SOAP.", Retrieved at <<http://citeseerx.ist.psu.edu/viewdoc/download?doi=10.1.1.80.6494&rep=rep1&type=pdf>>, In Journal of Decision Support Systems—Special Issue, Jul. 2005, pp. 35.
Manning, et al., "Foundations of Statistical Natural Language Processing", Retrieved at <<http://cs.famaf.unc.edu.ar/~laura/llibres/snlp.pdf>>, In Book of Foundations of Statistical Natural Language Processing, Jun. 18, 1999, pp. 704.
Aguilera, et al., "Performance Debugging for Distributed Systems of Black Boxes", Retrieved at <<http://pdos.csail.mit.edu/~athicha/papers/blackboxes:sosp03.pdf>>, In Proceedings of the Nineteenth ACM Symposium on Operating Systems Principles, Oct. 19, 2003, pp. 16.
Aho, et al., "Efficient String Matching: An Aid to Bibliographic Search", Retrieved at <<http://cisc-w09.isrl.kr/cgi-bin/TUBoard/db/seminar/upload/1183356194165246034173/p333-aho-corasick.pdf>>, In Communications of the ACM, vol. 18, No. 6, Jun. 1975, pp. 8.
Barnes, et al., "A Hierarchical O (N log N) Force-calculation Algorithm", Retrieved at <<http://www.ecs.umass.edu/~mettu/ece665/barnes_86.pdf>>, In Letters to Nature, vol. 324, Issue 4, Dec. 1986, pp. 4.
Bostock, et al., "D3: Data-Driven Documents.", Retrieved at <<http://vis.stanford.edu/files/2011-D3-InfoVis.pdf>>, In IEEE Transactions on Visualization and Computer Graphics, vol. 17, No. 12, Jan. 2011, pp. 9.
Brauckhoff, et al., "Anomaly Extraction in Backbone Networks using Association Rules", Retrieved at <<http://www.csg.ethz.ch/people/dimitroc/papers/imc09.pdf>>, In Proceedings of the 9th ACM SIGCOMM Conference on Internet Measurement Conference, Nov. 4, 2009, pp. 7.
Bray, et al., "Extensible Markup Language (XML)", Retrieved at <<http://www.w3.org/TR/PR-xml-971208>>, In Journal of World Wide Web Consortium, Dec. 8, 1997, pp. 7.
Church, et al., "Word Association Norms, Mutual Information, and Lexicography", Retrieved at <<http://acl.ldc.upenn.edu/J/J90/J90-1003.pdf>>, In Journal of Computational Linguistics, vol. 16, No. 1, Mar. 1990, pp. 8.
Cohen, et al., "Capturing, Indexing, Clustering, and Retrieving System History", Retrieved at <<http://www.research.rutgers.edu/~lekien/papers/Cohen_etalSOSP2005.pdf>>, In Proceedings of the Twentieth ACM Symposium on Operating systems Principles, Oct. 23, 2005, pp. 14.
Cooley, et al., "Web Mining: Information and Pattern Discovery on the World Wide Web", Retrieved at <<http://ieeexplore.ieee.org/stamp/stamp.jsp?tp=&arnumber=632303>>, In Proceedings of the Ninth IEEE International Conference on Tools with Artificial Intelligence, Nov. 3, 1997, pp. 10.
Fielding, Roy Thomas., "Architectural Styles and the Design of Network-based Software Architectures", Retrieved at <<http://jpkc.fudan.edu.cn/picture/article/216/35/4b/22598d594e3d93239700ce79bce1/7ed3ec2a-03c2-49cb-8bf8-5a90ea42f523.pdf>>, In Doctoral Dissertation Architectural Styles and the Design of Network-based Software Architectures, Aug. 8, 2012, pp. 180.
Garrett, Jesse James., "Ajax: A New Approach to Web Applications", Retrieved at <<http://scholar.googleusercontent.com/

(56) References Cited

OTHER PUBLICATIONS scholar?q=cache:DY1KmbMV5IMJ:scholar.google.com/+Ajax:+A+new+approach+to+web+applications&hl=en&as_sdt=0,5>>, Feb. 18, 2005, pp. 14.

Goldstein, et al., "Summarizing Text Documents: Sentence Selection and Evaluation Metrics", Retrieved at <<http://www.cs.cmu.edu/afs/cs.cmu.edu/Web/People/jgc/publication/Summarizing_Text_Documents_Sentence_SIGIR_1999.pdf>>, In Proceedings of the 22nd Annual International ACM SIGIR Conference on Research and Development in Information Retrieval, Aug. 15, 1999, pp. 8.

Gruber, Thomas R.., "Toward Principles for the Design of Ontologies Used for Knowledge Sharing", Retrieved at <<http://www.civ.utoronto.ca/sect/coneng/i2c/Civ1283/Civ1283-Ref-Final/Civ1283-Advanced%20Ref/Ontology/Gruber%20paper.pdf>>, In International Journal of Human-Computer Studies—Special Issue, Nov. 1995, pp. 22.

"HTML5: A Vocabulary and Associated APIs for HTML and XHTML.", Retrieved at <<http://www.w3.org/TR/2010/WD-html5-20100624/>>, Aug. 7, 2012, pp. 23.

Deerwester, et al., "Indexing by Latent Semantic Analysis", Retrieved at <<http://www.cob.unt.edu/itds/faculty/evangelopoulos/dsci5910/LSA_Deerwester1990.pdf>>, In Journal of the American Society for Information Science, vol. 41, Issue 6, Sep. 1990, pp. 17.

Khanna, et al., "Automated Rule-Based Diagnosis through a Distributed Monitor System", Retrieved at <<http://ieeexplore.ieee.org/stamp/stamp.jsp?tp=&arnumber=4358702>>, In IEEE Transactions on Dependable and Secure Computing, vol. 4, Issue 4, Oct. 2007, pp. 266-279.

Konig, et al., "Reducing the Human Overhead in Text Categorization", Retrieved at <<http://research.microsoft.com/pubs/68150/rtpp139-konig.pdf>>, In Proceedings of the 12th ACM SIGKDD International Conference on Knowledge Discovery and Data Mining, Aug. 20, 2006, pp. 6.

Lim, et al., "A Log Mining Approach to Failure Analysis of Enterprise Telephony Systems", Retrieved at <<http://ieeexplore.ieee.org/stamp/stamp.jsp?arnumber=04630109>>, In IEEE International Conference on Dependable Systems and Networks with FTCS and DCC, Jun. 24, 2008, pp. 6.

MacKay, David J.C., "Information Theory, Inference, and Learning Algorithms", Retrieved at <<http://www.cs.toronto.edu/~mackay/itprnn/book.pdf>>, In Book of Information Theory, Inference & Learning Algorithms, Oct. 6, 2003, pp. 640.

Mani, et al., "The Tipster Summac Text Summarization Evaluation", Retrieved at <<http://acl.ldc.upenn.edu/E/E99/E99-1011.pdf>>, In Proceedings of the Ninth Conference on European Chapter of the Association for Computational Linguistics, Jun. 8, 1999, pp. 9.

Notice of Allowance Mailed May 29, 2015 from U.S. Appl. No. 13/535,366, 9 pages.

Ahonen et al., "Applying Data Mining Techniques for Descriptive Phrase Extraction in Digital Document Collections," 1998, IEEE, Proceedings of ADL '98, Apr. 22-24, pp. 1-10.

Response Filed Apr. 30, 2015 to Final Office Action mailed Feb. 12, 2015 from U.S. Appl. No. 13/535,366, 13 pages.

Final Office Action mailed Feb. 12, 2015 from U.S. Appl. No. 13/535,366, 13 pages.

Response Filed Dec. 1, 2014 to Non-Final Office Action mailed Sep. 24, 2014 from U.S. Appl. No. 13/535,366, 13 pages.

Non-Final Office Action mailed Sep. 24, 2014 from U.S. Appl. No. 13/535,366, 16 pages.

Smadja, Frank, "Retrieving Collocations from Text: Xtract," Retrieved at <<http://acl.ldc.upenn.edu/J/J93/J93-1007.pdf>>, In Journal of Computational Linguistics, vol. 19, No. 1, Mar. 1993, pp. 143-177.

Final Office Action mailed Jul. 17, 2015 from U.S. Appl. No. 13/861,857, 16 pages.

Brown, C.E., "Coefficient of Variation," in AMSGRS, 1998, pp. 155-157.

Second Written Opinion from PCT/US2013/070188, Mailed Oct. 29, 2014, 6 pages.

Response to Oct. 29, 2014 Second Written Opinion from PCT/US2013/070188, Filed Nov. 21, 2014, 6 pages.

Written Opinion of the International Preliminary Examination Authority, From PCT Patent Application No. PCT/US2013/070188, Mailed Date: May 19, 2014. 18 pages.

Response to the Mar. 28, 2014 International Search Report and Written Opinion: Article 34 Demand, From PCT/US2013/070188, filed Sep. 5, 2014. 8 pages.

Response to the Mar. 28, 2014 International Search Report & Written Opinion, from PCT Patent Application No. PCT/US2013/070327, Filed Sep. 5, 2014. 8 pages.

Non-Final Office Action, From U.S. Appl. No. 13/409,111, filed Mar. 1, 2012, Mailed: Jan. 16, 2014. 15 pages.

Response to the Jan. 16, 2014 Non-Final Office Action, From U.S. Appl. No. 13/409,111, filed Apr. 11, 2014. 14 pages.

Final Office Action, From U.S. Appl. No. 13/409,111, Mailed: Jun. 2, 2014. 15 pages.

Response to the Jun. 2, 2014 Final Office Action, From U.S. Appl. No. 13/409,111, filed Sep. 2, 2014. 15 pages.

Non-Final Office Action, From U.S. Appl. No. 13/409,111, Mailed: Sep. 12, 2014. 16 pages.

Notice of Allowance Mailed Feb. 13, 2014, From U.S. Appl. No. 13/409,111. 8 pages.

"Response to the Sep. 9, 2014 Non-Final Office Action" filed Dec. 11, 2014 from U.S. Appl. No. 13/409,111. 11 pages.

Non-Final Office Action Mailed Apr. 18, 2014, from U.S. Appl. No. 13/536,782. 8 pages.

Response to the Apr. 18, 2014 Non-Final Office Action Filed Jul. 25, 2014, from U.S. Appl. No. 13/536,782. 12 pages.

Notice of Allowance Mailed Aug. 20, 2014, from U.S. Appl. No. 13/536,782. 5 pages.

Notice of Allowance Mailed Feb. 17, 2015, from U.S. Appl. No. 13/536,782. 6 pages.

Manning et al., "Introduction to Information Retrieval", Retrieved at <<http://www.math.unipd.it/~aiolli/corsi/0910/IR/irbookprint.pdf>>, In Book of Introduction to Information Retrieval, May 27, 2008, pp. 504.

Marcus et al., "Building a Large Annotated Corpus of English: The Penn Treebank", Retrieved at <<http://delivery.acm.org/10.1145/980000/972475/p313-marcus.pdf>>, In Journal of Computational Linguistics—Special Issue on Using Large Corpora, vol. 19, Issue 2, Jun. 1993, pp. 18.

McCallum et al., "Early Results for Named Entity Recognition with Conditional Random Fields, Feature Induction and Web-Enhanced Lexicons", Retrieved at <<http://people.cs.umass.edu/~mccallum/papers/mccallum-conll2003.pdf>>, In Proceedings of the Seventh Conference on Natural language learning at HLT-NAACL, vol. 4, May 31, 2003, pp. 4.

Medem et al., "TroubleMiner: Mining Network Trouble Tickets", Retrieved at <<http://ieeexplore.ieee.org/stamp/stamp.jsp?tp=&arnumber=5195946>>, In IFIP/IEEE International Symposium on Integrated Network Management-Workshops, Jun. 1, 2009, pp. 7.

Melchiors et al., "Troubleshooting Network Faults Using Past Experience", Retrieved at <<http://ieeexplore.ieee.org/stamp/stamp.jsp?arnumber=00830413>>, In IEEE/IFIP Network Operations and Management Symposium, Apr. 10, 2000, pp. 14.

"SQL Server", Retrieved at <<http://www.microsoft.com/sqlserver/en/us/default.aspx>>, Aug. 8, 2012, pp. 12.

Huang et al., "Diagnosing Network Disruptions with Network-Wide Analysis", Retrieved at <<http://www.cc.gatech.edu/~jx/reprints/metrics160.pdf>>, In Proceedings of the ACM SIGMETRICS International Conference on Measurement and Modeling of Computer Systems, Jun. 12, 2007, pp. 12.

Kandula et al., "What's Going On? Learning Communication Rules In Edge Networks", Retrieved at <<http://citeseerx.ist.psu.edu/viewdoc/download?doi=10.1.1.145.3918&rep=rep1&type=pdf>>, In Proceedings of the ACM SIGCOMM Conference on Data Communication, Aug. 17, 2008, pp. 12.

Loper et al., "NLTK: The Natural Language Toolkit", Retrieved at <<http://arxiv.org/pdf/cs/0205028v1.pdf>>, In Proceedings of the Workshop on Effective Tools and Methodologies for Teaching Natural Language Processing and Computational Linguistics, May 17, 2002, pp. 8.

(56) References Cited

OTHER PUBLICATIONS

Manber et al., "Suffix arrays: A New Method for on-Line String Searches", Retrieved at <<http://webglimpse.net/pubs/suffix.pdf>>, In Proceedings of the First Annual ACM-SIAM Symposium on Discrete Algorithms, Jan. 22, 1990, pp. 16.

Mitra et al., "Automatic Text Summarization by Paragraph Extraction", Retrieved at <<http://www.aclweb.org/anthology-new/W/W97/W97-0707.pdf>>, In Proceedings of the Workshop on Intelligent Scalable Summarization at the ACL/EACL Conference, Jul. 7, 1997, pp. 8.

Nagao et al., "A New Method of N-Gram Statistics for Large Number of N and Automatic Extraction of Words and Phrases from Large Text Data of Japanese", Retrieved at <<http://delivery.acm.org/10.1145/1000000/991994/p611-nagao.pdf>>, In COLING '94 Proceedings of the 15th Conference on Computational linguistics, vol. 1, Aug. 5, 1994, pp. 5.

Noy et al., "Ontology Development 101: A Guide to Creating Your First Ontology.", Retrieved at <<http://protege.stanford.edu/publications/ontology_development/ontology101.pdf>>, In Technical Report of Stanford Knowledge Systems Laboratory and Stanford Medical Informatics, Mar. 2001, pp. 25.

Paolacci et al., "Running Experiments on Amazon Mechanical Turk", Retrieved at <<http://repub.eur.nl/res/pub/31983/jdm10630a[1].pdf>>, In Judgment and Decision Making, vol. 5, No. 5, Aug. 2010, pp. 9.

Qiu et al., "What Happened in My Network? Mining Network Events from Router Syslogs", Retrieved at <<http://conferences.sigcomm.org/imc/2010/papers/p472.pdf>>, In Proceedings of the 10th ACM SIGCOMM Conference on Internet Measurement, Nov. 1, 2010, pp. 13.

Raghavendra et al., "No Power Struggles: Coordinated Multi-level Power Management for the Data Center", Retrieved at <<http://www.cs.pitt.edu/~kirk/cs3150spring2010/2008_asplos_nopowerstruggles.pdf>>, In ACM SIGOPS Operating Systems Review, vol. 42, Issue 2, Mar. 1, 2008, pp. 12.

Seemakurty et al., "Word Sense Disambiguation via Human Computation", Retrieved at <<http://www.cs.cmu.edu/~tomasic/doc/2010/SeemakurtyEtAIHCOMP2010.pdf>>, In Proceedings of the ACM SIGKDD Workshop on Human Computation, Jul. 25, 2010, pp. 4.

Roughan et al., "IP Forwarding Anomalies and Improving their Detection Using Multiple Data Sources", Retrieved at <<http://citeseerx.ist.psu.edu/viewdoc/download?doi=10.1.1.1.5316&rep=rep1&type=pdf>>, In Proceedings of the ACM SIGCOMM Workshop on Network Troubleshooting, Aug. 30, 2004, pp. 6.

Sorokin et al., "Utility Data Annotation with Amazon Mechanical Turk", Retrieved at <<http://ieeexplore.ieee.org/stamp/stamp.jsp?tp=&arnumber=4562953>>, In IEEE Computer Society Conference on Computer Vision and Pattern Recognition Workshops, Jun. 23, 2008, pp. 8.

Toutanova et al., "Enriching the Knowledge Sources Used in a Maximum Entropy Part-of-Speech Tagger", Retrieved at <<http://nlp.stanford.edu/~manning/papers/emnlp2000.pdf>>, In Proceedings of the Joint SIGDAT Conference on Empirical Methods in Natural Language Processing and Very Large Corpora, Oct. 7, 2000, pp. 8.

Ukkonen, Esko., "On-Line Construction of Suffix Trees", Retrieved at <<http://www.cs.helsinki.fi/u/ukkonen/SuffixT1withFigs.pdf>>, In Journal of Algorithmica, Sep. 1995, pp. 18.

Ahn, Luis Von., "Games with a Purpose", Retrieved at <<http://www.cs.cmu.edu/~biglou/ieee-gwap.pdf>>, In Computer, Volume, Jun. 2006, pp. 3.

Ahn et al., "Labeling Images with a Computer Game", Retrieved at <<http://www.cs.cmu.edu/~biglou/ESP.pdf>>, In Proceedings of the SIGCHI Conference on Human Factors in Computing Systems, Apr. 24, 2004, pp. 8.

Welch,Terry A.., "A Technique for High-Performance Data Compression", Retrieved at <<http://ieeexplore.ieee.org/stamp/stamp.jsp?tp=&arnumber=1659158>>, In Computer, vol. 17, Issue 6, Jun. 1984, pp. 12.

Wu et al., "Open Information Extraction Using Wikipedia", Retrieved at <<http://www.cs.washington.edu/homes/weld/papers/wu-acl10.pdf>>, In Proceedings of the 48th Annual Meeting of the Association for Computational Linguistics, Jul. 11, 2010, pp. 10.

Yamamoto et al., "Using Suffix Arrays to Compute Term Frequency and Document Frequency for All Substrings in a Corpus", Retrieved at <<http://acl.ldc.upenn.edu/J/J01/J01-1001.pdf>>, In Journal of Computational Linguistics, vol. 27, Issue 1, Mar. 2001, pp. 30.

Yuan et al., "SherLog: Error Diagnosis by Connecting Clues from Run-time Logs", Retrieved at <<http://opera.ucsd.edu/paper/asplos10-sherlog.pdf>>, In Newsletter of ACM SIGARCH Computer Architecture News, vol. 38, Issue 1, Mar. 2010, pp. 12.

Zhang et al., "Extraction of Chinese Compound Words—An Experimental Study on a Very Large Corpus", Retrieved at <<http://acl.ldc.upenn.edu/W/W00/W00-1219.pdf>>, In Proceedings of the Second Workshop on Chinese language Processing, Oct. 2000, pp. 8.

Xu et al., "Detecting Large-Scale System Problems by Mining Console Logs", Retrieved at <<http://www.sigops.org/sosp/sosp09/papers/xu-sosp09.pdf>>, In Proceedings of the ACM SIGOPS 22nd Symposium on Operating Systems Principles, Oct. 11, 2009, pp. 16.

Barco, et al., "Automated Troubleshooting of Mobile Networks Using Bayesian Networks", Retrieved at << http://www.lcc.uma.es/~eva/doc/materiales/barco.pdf >>, Proceedings of the IASTED International Conference Communication Systems and Networks, Sep. 9, 2002, pp. 6.

Yamanishi et al., "Dynamic Syslog Mining for Network Failure Monitoring", Retrieved at <<http://citeseerx.ist.psu.edu/viewdoc/download?doi=10.1.1.96.8083&rep=rep1&type=pdf>>, In Proceedings of the Eleventh ACM SIGKDD International Conference on Knowledge Discovery in Data Mining, Aug. 21, 2005, pp. 10.

"Attensity Text Analytics Software", Attensity White Paper, retrieved on Apr. 15, 2015, 14 pages.

"Enterprise Feedback Management", Published on: Jun. 30, 2012, retrieved at <<http://www.forumresearch.com/services-enterprise-feedback-management.asp>>, 2 pages.

Aciar, Silvana, "Mining Context Information from Consumer's Reviews", Proceedings of 2nd Workshop on Context-Aware Recommender Systems, Sep. 30, 2010, 5 pages.

Baysal, et al., "A Bug You Like: A Framework for Automated Assignment of Bugs", IEEE 17th International Conference on Program Comprehension, May 17, 2013, 2 pages.

Benson, M., "Collocations and General-Purpose Dictionaries," International Journal of Lexicography, 1990, 12 pages.

Bettenburg, et al., "Duplicate Bug Reports Considered Harmful Really?", IEEE International Conference on Software Maintenance, 2008, 9 pages.

Bettenburg, et al., "Extracting Structural Information from Bug Reports," ACM International Working Conference on Mining Software Repositories, 2008, 4 pages.

Bhattacharya, et al., "Automated, Highly-Accurate, Bug Assignment Using Machine Learning and Tossing Graphs", Journal of Systems and Software, vol. 85, Issue 10, Oct. 2012, 18 pages.

Brugnoni, et al., "An Expert system for Real Time Fault Diagnosis of the Italian Telecommunications Network," International Symposium on Integrated Network Management, 1993, 13 pages.

Goryachev, et al., "Implementation and Evaluation of Four Different Methods of Negation Detection," Tech. Rep., DSG, 2006, 7 pages.

Goyal, et al., "Streaming for Large Scale NLP: Language Modeling," Annual Conference of the Association for Computational Linguistics, 2009, 9 pages.

Heafield, K., "Kenlm: Faster and Smaller Language Model Queries," Workshop on Statistical Machine Translation, 2011, 11 pages.

Hooimeijer, et al., "Modeling Bug Report Quality," IEEE/ACM International Conference on Automated Software Engineering, 2007, 10 pages.

Jonsson, et al., "Automated Bug Assignment: Ensemble-based Machine Learning in Large Scale Industrial Contexts", Proceedings of Empirical Software Engineering, retrieved on Apr. 29, 2015, 52 pages.

Just, et al., "Towards the Next Generation of Bug Tracking Systems," IEEE Symposium on Visual Languages and Human-entric Computing, 2008, 4 pages.

(56) References Cited

OTHER PUBLICATIONS

Kittur, et al., "Crowdsourcing User Studies with Mechanical Turk," ACM SIGCHI Conference on Human Factors in Computing Systems, 2008, 4 pages.
Lang, et al., "Enhancing Business Intelligence with Unstructured Data", Proceedings of Conference on Database Systems in Business, Technology and Web, Mar. 2, 2009, pp. 469-485, 17 pages.
Mysore et al., "PortLand: A Scalable Fault-Tolerant Layer 2 Data Center Network Fabric", Proceedings of the ACM SIGCOMM 2009 Conference on Data Communication, vol. 39, Issue 4, Oct. 2009, pp. 39-50, 12 pages.
Runeson, P., et al., "Detection of Duplicate Defect Reports Using Natural Language Processing," IEEE International Conference on Software Engineering, 2007, 10 pages.
CodePlex, Project Hosting for Open Source Software, "SharpNPL—Open Source Natural Language Processing Tools", retrieved at https://web.archive.org/web/20120623043531/http://sharpnlp.codeplex.com/, Dec. 13, 2006, 2 pages.
Shokripour, et al., "Automatic Bug Assignment Using Information Extraction Methods", In Proceedings of International Conference on Advanced Computer Science Applications and Technologies, Nov. 26, 2012, 6 pages.
Simm, et al., "Classification of Short Text Comments by Sentiment and Actionability for VoiceYourView", In Proceedings of IEEE International Conference on Social Computing / IEEE International Conference on Privacy, Security, Risk and Trust, Aug. 20, 2010, pp. 552-557, 6 pages.
Sukumaran, et al., "Integrating Structured and Unstructured Data Using Text Tagging and Annotation", In the Data Administration Newsletter, May 29, 2007, 6 pages.
Weight, "Allegiance: How Text Analytics Changes Everything", Retrieved on Apr. 15, 2015, at <<https://www.allegiance.com/documents/text_analytics.pdf>>, 6 pages.
Notice of Allowance mailed Aug. 5, 2015 from U.S. Appl. No. 13/536,782, 6 pages.
Notice of Allowance mailed Feb. 13, 2015 from U.S. Appl. No. 13/409,111, 8 pages.
Notice of Allowance Mailed Sep. 14, 2015 From U.S. Appl. No. 13/924,452, 7 pages.
Response filed Sep. 22, 2015 to Non-Final Office Action mailed Jul. 17, 2015 from U.S. Appl. No. 13/861,857, 11 pages.
Notice of Allowance mailed Oct. 6, 2015 from U.S. Appl. No. 13/535,366, 6 pages.
Ellram et al., "Total Cost of Ownership a Key Concept in Strategic Cost Management Decisions", Journal of Business Logistics, vol. 19, No. 1, 1998, pp. 55-84, 28 pages.
Ellram, "Total Cost of Ownership: An Analysis Approach for Purchasing," PDLM Journal of Physical Distribution & Logistics Management, vol. 25, No. 8, 1995, pp. 4-23, 24 pages.
Voluntary Amendments filed Nov. 13, 2015 from China Patent Application No. 201380059928.0, 12 pages.
Notice of Allowance mailed Nov. 3, 2015 from U.S. Appl. No. 13/536,782, 6 pages.
Supplemental Notice of Allowability mailed Nov. 19, 2015 from U.S. Appl. No. 13/535,366, 3 pages.
Intention to Grant mailed Nov. 24, 2015 from European Patent Application No. 13802771.9, 55 pages.
Notice of Intention to Grant Mailed Nov. 24, 2015 from European Patent Application No. 13802771.9, 53 pages.
Supplemental Notice of Allowability mailed Dec. 9, 2015 from U.S. Appl. No. 13/535,366, 3 pages.
Final Office Action mailed Dec. 1, 2015 from U.S. Appl. No. 13/861,857, 23 pages.
Response filed Feb. 2, 2016 to the Final Office Action mailed Dec. 1, 2015 from U.S. Appl. No. 13/861,857, 12 pages.

\* cited by examiner

CHARACTERIZING SERVICE LEVELS ON AN ELECTRONIC NETWORK

BACKGROUND

Applications are often deployed in data centers, where the applications execute on one or more servers. A data center generally has a network that includes a number of different network devices, such as various types of routers, switches, etc. A failure of any individual network device can sometimes cause the application to be unavailable from outside the data center. Thus, from the perspective of an end user, the availability of an application is dependent not only on whether the application itself is executing properly, but also on the proper functioning of intervening network devices that connect the application to the end user.

To address this issue, network devices may be deployed in redundant pairs or larger groups. Redundant network devices and/or links can provide some measure of protection against individual device failures or link failures, because when an individual device/link in a given group fails, the other device will sometimes continue functioning and, therefore, the application may still be reachable by end users. Thus, whether a particular application is reachable from outside the data center depends not only on the proper functioning of the individual network devices, but also on how effective the redundant groups are at preserving connectivity when one or more devices in the redundant groups fail.

SUMMARY

The above listed example is intended to provide a quick reference to aid the reader and is not intended to define the scope of the concepts described herein.

This document relates to processing electronic data. One implementation is manifest as a technique that can include obtaining events from one or more event logs. The events can reflect failures by one or more network devices in one or more data centers. The technique can also include filtering the events using one or more criteria to obtain a sub-set of the events. The technique can also include determining one or more network stamps of an application, characterizing one or more service levels of individual network devices in the one or more network stamps using the sub-set of the events, and characterizing a service level of the application based on the service levels of the individual network devices in the one or more network stamps.

Another implementation is manifest as one or more computer-readable storage devices comprising instructions which, when executed by one or more processing devices, cause the one or more processing devices to perform acts. The acts can include obtaining events from one or more event logs. The events can reflect failures by one or more network devices in one or more data centers. The acts can also include filtering the events using one or more criteria to obtain a sub-set of the events and characterizing one or more service levels of the network devices using the sub-set of the events. The acts can also include determining one or more correlations of the service levels and identifying one or more risky devices based on the one or more correlations.

Another implementation is manifest as a system that can include an event analysis component and one or more processing devices configured to execute the event analysis component. The event analysis component can be configured to obtain events from event logs, the events reflecting failures on a network by one or more network devices in one or more data centers. The event analysis component can also be configured to characterize a service level of an application or a network device based on the events, and to identify one or more recommended potential network changes to change the service level of the application or the network device. The one or more recommended potential network changes can be recommended based on at least one of expected costs or expected benefits associated with the recommended potential network changes.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

Figure 1:
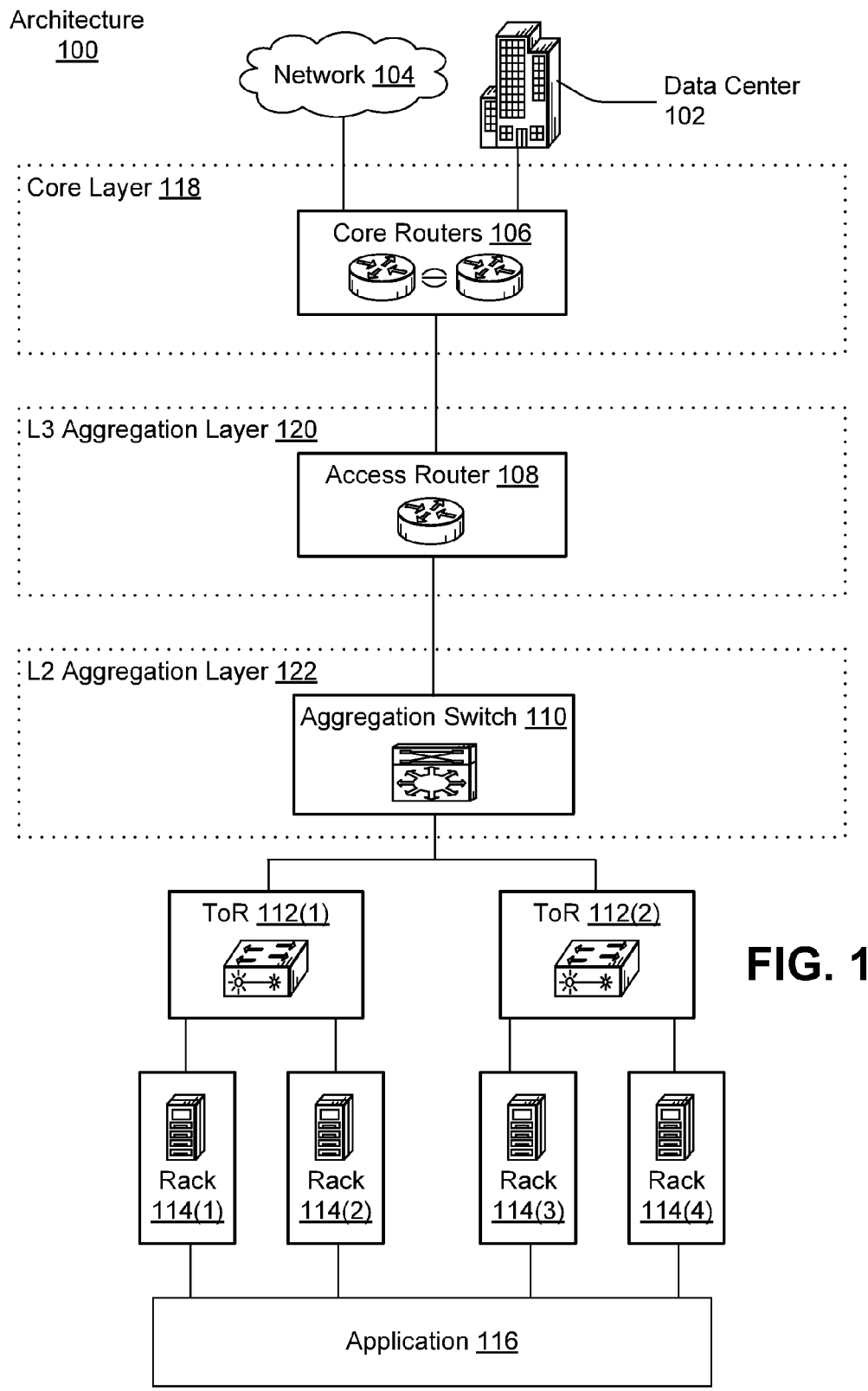
FIGS. 1-3 and 8 show exemplary data center architectures in which the present concepts can be employed in accordance with some implementations.

This discussion relates to characterizing service levels of devices or applications on an electronic network. For the purpose of this document, the term "service level" includes concepts such as reliability, availability, traffic flow/loss, etc. For example, availability relates to the fraction of time a given application, device, or hardware/software component is functioning on average over a given period of time, e.g., the "uptime" as measured on a time basis, such as an annual basis. Reliability relates to the likelihood of failure of a given application, device, or hardware component, e.g., the expected time until the next failure. Failure relates to instances when a given application, device, or component does not perform as intended.

Specific definitions of availability, reliability, and failure can be found in various references. Although the following definitions are not explicitly adopted herein, the following definitions may provide further clarity for the terms availability, reliability, and failure. For example, MIL-STD 721C defines availability as a measure of the degree to which an item is in an operable and committable state. MIL-STD 721C defines reliability as (1) the duration or probability of a failure-free performance under stated conditions or (2) the probability that an item will perform its intended function, without failure, for a specified interval under stated conditions. Failure can be defined as the inability of an item to function within its specified limits of performance (MIL-STD 721B) or as an event or inoperable state in which any item or part of any item does not or would not perform as previously specified (MIL-STD 721C).

Generally speaking, the disclosed implementations may characterize the service level of an individual network device, such as an access router, aggregation switch, etc. Additionally, the disclosed implementations may characterize the service level of an application that uses one or more network devices. The service level of an application can be a function of the service level of the network devices used by the application. Moreover, some of the network devices may be deployed in redundant groups of multiple devices. Thus, the service level of an application can be a function of how effective the redundant groups are at ensuring that application traffic can be routed without significant impact despite failures, e.g., some alternative path along alternative devices/links. The term "network service level" describes the service level of an application independently of failures of application code and/or computing devices executing the application, and relates to the service level of various network devices and links upon which an application depends for connectivity. For example, network service levels can be impacted by hardware failures (device or link failures), software failures (protocol, device operating system, firmware, etc.), as well as configuration failures. The term "network availability" is similarly independent of application code failures and failures of computing devices executing the application.

Some of the present techniques can leverage data center event logs, which may include events that are logged by various devices or applications. The events in the log can include error reports indicating failure of one or more devices in the data center. Event logs can be processed to evaluate the service levels of individual devices in the data center. In some implementations, the event logs can be filtered to provide a more compact data set for evaluating service levels, e.g., by filtering out duplicate events, merging simultaneous events, etc.

Data Center Example

FIG. 1 illustrates an example of a data center network architecture 100. The architecture can be manifest in a data center 102 that is connected to a network 104, such as the Internet. In this case, the architecture 100 includes devices or components such as one or more core routers 106, one or more access routers 108, one or more aggregation switches 110, one or more top-of-rack (ToR) switches 112(1) and 112(2), and one or more racks 114(1), 114(2), 114(3), and 114(4). Each of the racks 114 can include one or more server devices that host an application 116. Note that different instances of the various devices in FIG. 1 are distinguished by parenthetical references, e.g., 112(1) refers to a different ToR switch than 112(2). When referring to multiple devices collectively, the parenthetical will not be used, e.g., ToRs 112 can refer to either or both of ToR 112(1) or ToR 112(2). Note also that architecture 100 can include various devices or components not shown in FIG. 1, e.g., various intrusion detection and prevention systems, virtual private networks (VPNs), firewalls, load balancers, etc.

From a logical standpoint, the architecture 100 can be organized into a hierarchy that includes a core layer 118, an L3 aggregation layer 120, and a L2 aggregation layer 122. This logical organization can be based on the functional separation of Layer-2 (e.g., trunking, VLANs, etc.) and Layer-3 (e.g., routing) responsibilities. In FIG. 1, only one access router 108 and one aggregation switch 110 are shown, but examples with multiple access routers and multiple aggregation switches follow. In implementations with multiple access routers, the multiple access routers can be deployed in redundancy groups to provide redundancy at the L3 aggregation layer 120. Likewise, in implementations with multiple aggregation switches, the multiple aggregation switches can be deployed in redundancy groups to provide redundancy at the L2 aggregation layer 122. Generally, in a redundancy group, the group contains multiple members and individual members can perform the switching/routing functions when other member(s) of the redundancy group fail. Note also that FIG. 1 illustrates core routers 106 in a redundant configuration. While the following examples use redundant pairs of devices to explain certain inventive concepts, devices can be redundantly configured in groups of 2 or more. Thus, the term "group" as used herein encompasses both pairs of devices as well as larger groups.

Generally speaking, redundancy groups can be deployed in various configurations, including "active-standby" configurations and "active-active" configurations. In active-standby configurations, one or more devices are active (e.g., carrying traffic) and one or more other devices are on standby (e.g., not carrying traffic) and can be activated to take over for a failing device. In active-active configurations, the devices in the group are active and, when a device in the group fails, traffic that would have otherwise been carried by the failing device can be carried by the remaining members of the group.

ToRs 112 (also known as host switches) connect the servers hosted by the racks 114 to a remainder of the architecture 100 via an internal data center network represented by connecting lines in FIG. 1. Host ports in these ToR switches are often 10/100/1000 Ethernet, with the uplinks being Gigabit Ethernet or 10GE ports. The ToRs can be connected upstream to aggregation switch 110. These aggregation switches can serve as an aggregation point for Layer-2 traffic and typically support high-speed technologies such as 10 Gigabit Ethernet to carry large amounts of traffic (e.g., data).

Traffic from the aggregation switch 110 can be forwarded to the access router 108. The access router can use Virtual Routing and Forwarding (VRF) to create a virtual, Layer-3 environment for each tenant. (A tenant is an application, such as a service, hosted on servers which use network devices for connectivity—route traffic from/to users or other services to/from its hosted servers.) Thus, FIG. 1 illustrates a single tenant, application 116, although multiple tenants can execute on individual servers of racks 114. In some implementations, the L3 aggregation layer 120 can aggregate traffic from up to several thousand servers and route the traffic to core routers 106 that can connect to the rest of the architecture 100 and network 104.

Some implementations (especially user-facing applications) may use load balancers to improve the performance of hosted applications. Redundant pairs of load balancers can connect to the aggregation switch 110 and perform mapping between static IP addresses (exposed to clients through DNS) and dynamic IP addresses of the servers to process user requests to application 116. Load balancers can support different functionalities such as network address translation, secure sockets layer or transport layer security acceleration, cookie management, and data caching.

Firewalls can be deployed in some implementations to protect applications from unwanted traffic (e.g., DoS attacks) by examining packet fields at IP (Internet Protocol) layer, transport layer, and sometimes even at the application layer against a set of defined rules. Generally, software-based firewalls can be attractive to quickly implement new features. However, hardware-based firewalls are often used in data centers to provide performance-critical features.

Virtual private networks can augment the data center network infrastructure by providing switching, optimization and security for web and client/server applications. The virtual private networks can provide secure remote access. For example, the virtual private networks can implement secure sockets layer, transport layer security, or other techniques.

Considering FIG. 1, note that there are several points of failure which could result in the unavailability of application 116. For example, application 116 could have a software failure, hardware failure, misconfiguration, protocol error, or other malfunction that causes application 116 to stop executing properly on the servers of racks 114. Additionally, failure of both ToRs 112(1) and 112(2) can result in unavailability of application 116, as can concurrent failure of both of the redundantly-configured core routers 106. Note also that, since there is only a single aggregation switch 110 and a single access router 108 shown in FIG. 1, a failure of either of these individual devices could be sufficient to prevent users from accessing application 116 from outside data center 102.

For the purposes of this document, the network devices on which a given application depends to carry application traffic are referred to as the "network stamp" of the application. Thus, in FIG. 1, the network stamp of application 116 includes ToRs 112(1) and 112(2), aggregation switch 110, access router 108, and core routers 106. The following discussion will explain techniques for characterizing the service level of an application based on the network stamp of the application. In some implementations, the characterization of the service level can reflect redundant groups of network devices. Detailed examples are discussed herein with respect to the L2 aggregation layer 122 and the L3 aggregation layer 120. However, those skilled in the art will understand that these concepts are readily extensible to other network devices or layers of the network topology (e.g., core router redundancy, load balancer redundancy, etc.)

As a hypothetical example, for purposes of exposition, assume network 104, core routers 106, access router 108, aggregation switch 110, ToRs 112(1) and 112(2), racks 114(1)-114(4), and software of application 116 all exhibit perfect reliability—no failures ever. Also assume that application 116 is not hosted elsewhere and is only available via data center 102. Under this idealized set of circumstances, application 116 would exhibit 100% availability and infinite reliability. Now, assume that access router 108 is replaced with a device having 90% availability instead. Because there is no redundancy at the L3 aggregation layer 120, the availability of the application is now reduced to 90%. Note also that replacing aggregation switch 110, instead of access router 108, with a device having 90% availability would have a similar effect on the availability of application 116.

More generally, to compute network availability for a given application, network availability can be considered on an end-to-end basis for each component (link or device) carrying application traffic. Some implementations may assume statistical independence of failures among devices. Under such an assumption, if both aggregation switch 110 and access router 108 have 90% availability, the expected network availability of application 116 is (0.9*0.9)=0.81 or 81%. As discussed in more detail below, further implementations may consider the extent to which device failures are statistically correlated.

Data Center Example with L3 Redundancy

Figure 2:
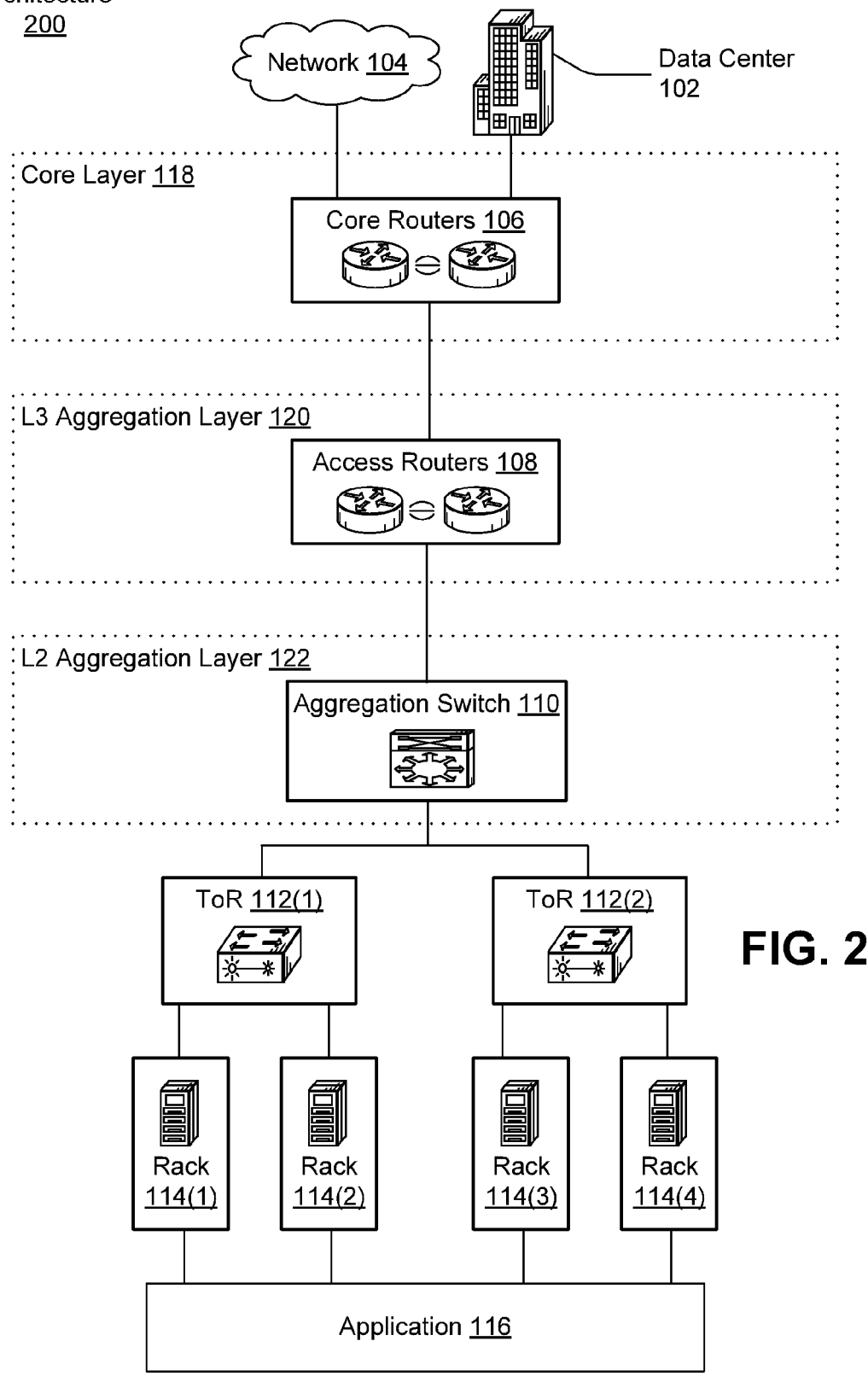

FIG. 2 illustrates data center 102 with a different architecture 200, e.g., in a different configuration to provide redundancy at the L3 aggregation layer 120. In FIG. 2, multiple access routers 108 are now deployed as a redundancy group, in this case, a redundancy pair. Thus, the difference between the network stamp of application 116 in FIG. 1 and FIG. 2 is the addition of an additional access router 108 in a redundant configuration in FIG. 2. The changes to the network stamp of application 116 can have different effects on the availability of application 116, as discussed more below.

Continuing with the hypothetical example introduced above, assume network 104, core routers 106, aggregation switch 110, ToRs 112(1) and 112(2), racks 114(1)-114(4), and software of application 116 all exhibit perfect reliability and 100% availability. Further, assume each individual device from access routers 108 exhibits 90% availability, and that a single access router can handle all of the application traffic in the event that the other access router fails (otherwise the remaining access router will drop traffic when the traffic is redirected to the remaining access router). The following scenarios illustrate how the effectiveness of the redundancy may vary depending upon whether failures of the individual access routers are closely correlated.

In one "zero redundancy" hypothetical circumstance, the addition of redundancy at the L3 aggregation layer 120 provides no additional benefit relative to a single, 90% available access router 108. Specifically, consider the case where the individual devices of access routers 108 always fail together. Under these circumstances, the availability of application 116 is still 90%, since the redundant pair of access routers 108 effectively still functions as a single point of failure.

Now, consider a different "perfect redundancy" hypothetical circumstance where the individual redundant access routers 108 never fail together. In this circumstance, the availability of application 116 is 100%. Hypothetically, two redundant access routers with perfect redundancy, i.e., never failing together, could provide 100% availability with only 50% availability for each individual device. Continuing with the hypothetical example, in a redundant group of 3 access routers 108, the individual devices need only exhibit availability $\frac{1}{3}$ of the time, a group of 4 devices needs $\frac{1}{4}$ availability, etc.

In practice, redundant devices are not likely to provide zero redundancy or perfect redundancy. Rather, sometimes the individual devices in a redundant group will fail together, e.g., due to a common cause such as a power outage at a location where the redundancy group is located. Other times, some of the devices in the redundancy group will fail while other devices in the group continue functioning properly. For example, a power supply for one device in a redundancy group may fail causing one device in the group to fail. The following discussion explores techniques for characterizing application and device service levels in view of these practical considerations.

As mentioned above with respect to FIG. 1, one practical approach used in some implementations is to assume statistical independence of failures. Here, given the assumptions above, the hypothetical network availability is the probability that at least one access router is available.

$Pr$(at least 1 access router is available)=1–$Pr$(no access router is available)=1–$Pr$(access router 1 isn't available)*$Pr$(access router 2 isn't available)=1–(1–0.9)*(1–0.9)=1–(1–0.9)^2=1–0.01=0.99

Thus, using redundancy, higher system availability can be achieved even though the individual components of the system have lower availability of 0.9 each. More generally, the equation:

$Pr$(at least 1 access router available)=1–(1–$Pr$(access router failing))^#of access routers can be used to generalize to different numbers of access routers. The equation can be generalized in a straightforward manner to other device types/links/numbers of data centers as well.

For example, the previous examples illustrate the notion of intra-data center redundancy, e.g., redundancy of devices or links within a given data center. Some implementations may consider service levels of inter-data center redundancy as well, e.g., circumstances where applications are hosted at multiple data centers. Inter-data center redundancy can be considered when evaluating the service level of an application in a manner similar to that set forth above. Thus, for example, the expected availability of an application hosted at two data centers with availability of 90% each is 99%, assuming statistical independence of failures by the two data centers and that each data center is individually capable of carrying the necessary application traffic.

Data Center Example with L2 and L3 Redundancy

Figure 3:
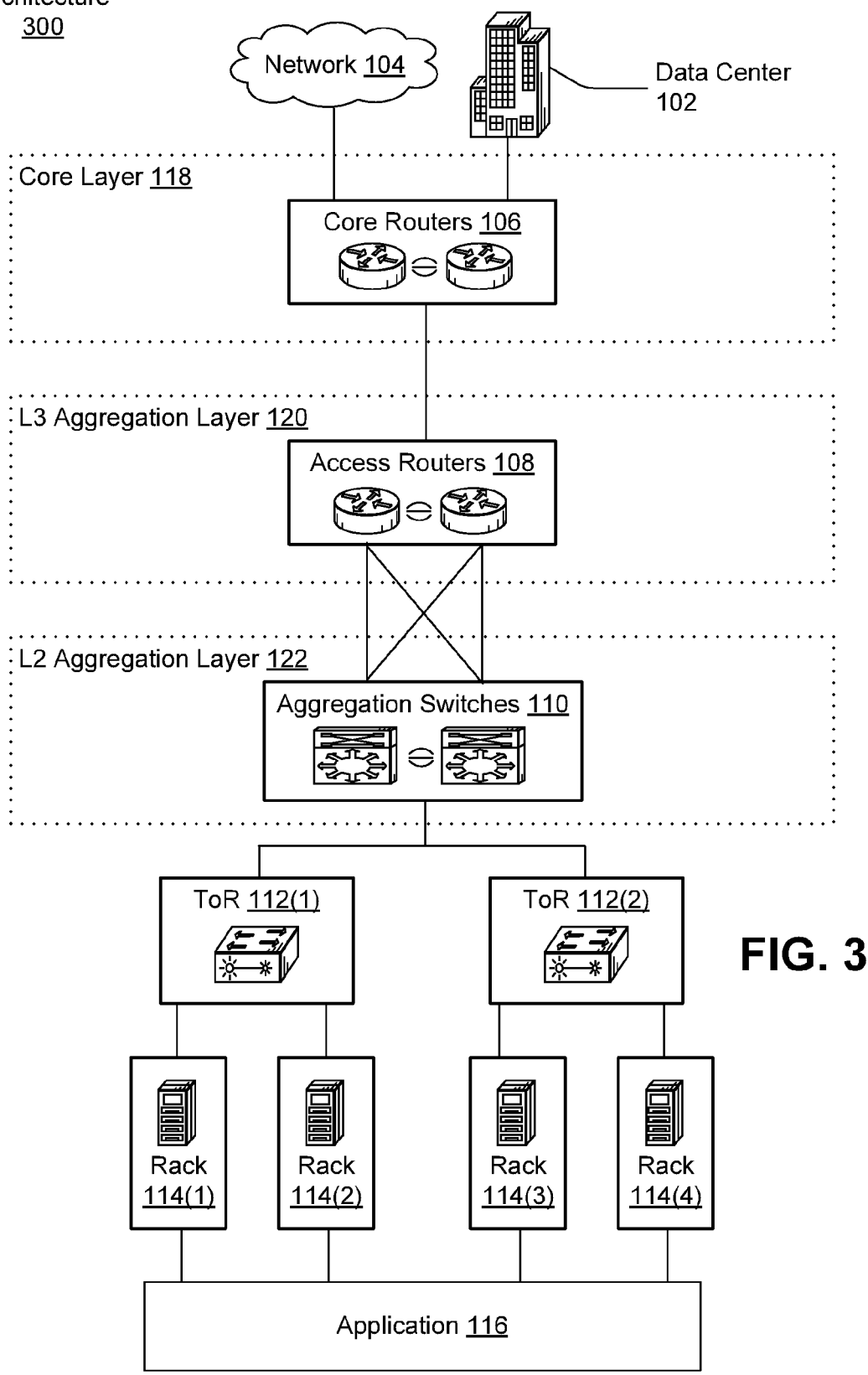

FIG. 3 illustrates an architecture 300, where data center 102 is in a different configuration to provide redundancy at both the L3 aggregation layer 120 and the L2 aggregation layer 122. In FIG. 3, a pair of aggregation switches 110 are now deployed as a redundancy group at the L2 aggregation layer 122 and are coupled to the redundant pair of access routers 108 in L3 aggregation layer 120. Thus, the difference between the network stamp of application 116 in FIG. 2 and FIG. 3 is the addition of an additional aggregation switch 110 in a redundant configuration in FIG. 3. Again, the changes to the network stamp of application 116 can have different effects on the availability of application 116 depending on the extent to which various device failures may be correlated.

Note that, in the example of FIG. 3, each aggregation switch 110 is connected to both access routers 108 from the redundant pair. Thus, as long as at least one access router 108 at the L3 aggregation layer 120 and one aggregation switch 110 at the L2 aggregation layer 122 is functioning, traffic can pass between ToRs 112(1) and 112(2) and core routers 106. This change to the network stamp of application 116 can have different effects on the availability of application 116, as discussed more fully below.

For example, consider another hypothetical scenario where network 104, core routers 106, ToRs 112(1) and 112(2), racks 114(1)-114(4), and software of application 116 continue to exhibit perfect reliability and 100% availability. Furthermore, assume that, collectively, the redundant group of access routers 108 at L3 aggregation layer 120 provides perfect redundancy—at least one of the two devices in the pair is always functioning properly and can handle the application traffic should the other device fail. In this hypothetical, the only point of failure is at the pair of aggregation switches 110 in L2 aggregation layer 122.

The "zero redundancy" hypothetical mentioned above with respect to the introduction of redundancy at the L3 aggregation layer 120 also applies to the redundant L2 aggregation layer 122 shown in FIG. 3. That is, if the individual aggregation switches in the redundant pair always fail together, there is no benefit to having multiple aggregation switches. Likewise, the "perfect redundancy" hypothetical also applies, e.g., if the individual aggregation switches 110 never fail together and can handle each other's application traffic, the availability of application 116 is 100%.

Moreover, note also that failures may occur at multiple layers and whether these failures tend to co-occur can affect the availability of application 116. Continuing with the hypothetical, assume that both the redundant pair of access routers 108 and the redundant pair of aggregation switches 110 exhibit 90% availability, e.g., 10% downtime. In other words, both access routers in the redundant pair are down 1 out of every 10 hours on average, and both aggregation switches in the redundant pair are down 1 out of every 10 hours. Note that, in a best-case hypothetical scenario, the failures of the redundant pairs at the L2 and L3 layers always occur together. Thus, the availability of application 116 is still 90%, because the failures always co-occur. In a worst-case scenario, the failure of the L2 layer may never co-occur with the L3 layer. In this case, the availability of application 116 is 80%, i.e., for every 10 hours of operation, one hour is lost to failure of the redundant aggregation switches at L2 and another is lost to the failure of the redundant access routers at L3.

For similar reasons as already discussed, neither the best-case scenario nor worst-case scenario is likely. Rather, sometimes the redundant pair of access routers will fail at the same time as the redundant pair of aggregation switches, and other times both devices in one pair will fail whereas at least one device in the other pair will continue functioning. Assuming statistical independence, the expected availability is 0.9*0.9 or 0.81 (81%). Since failures may or may not be statistically independent, some implementations may consider the extent to which failures at one layer may be correlated to failures at other layers when characterizing the service level of application 116.

System Example

Figure 4:
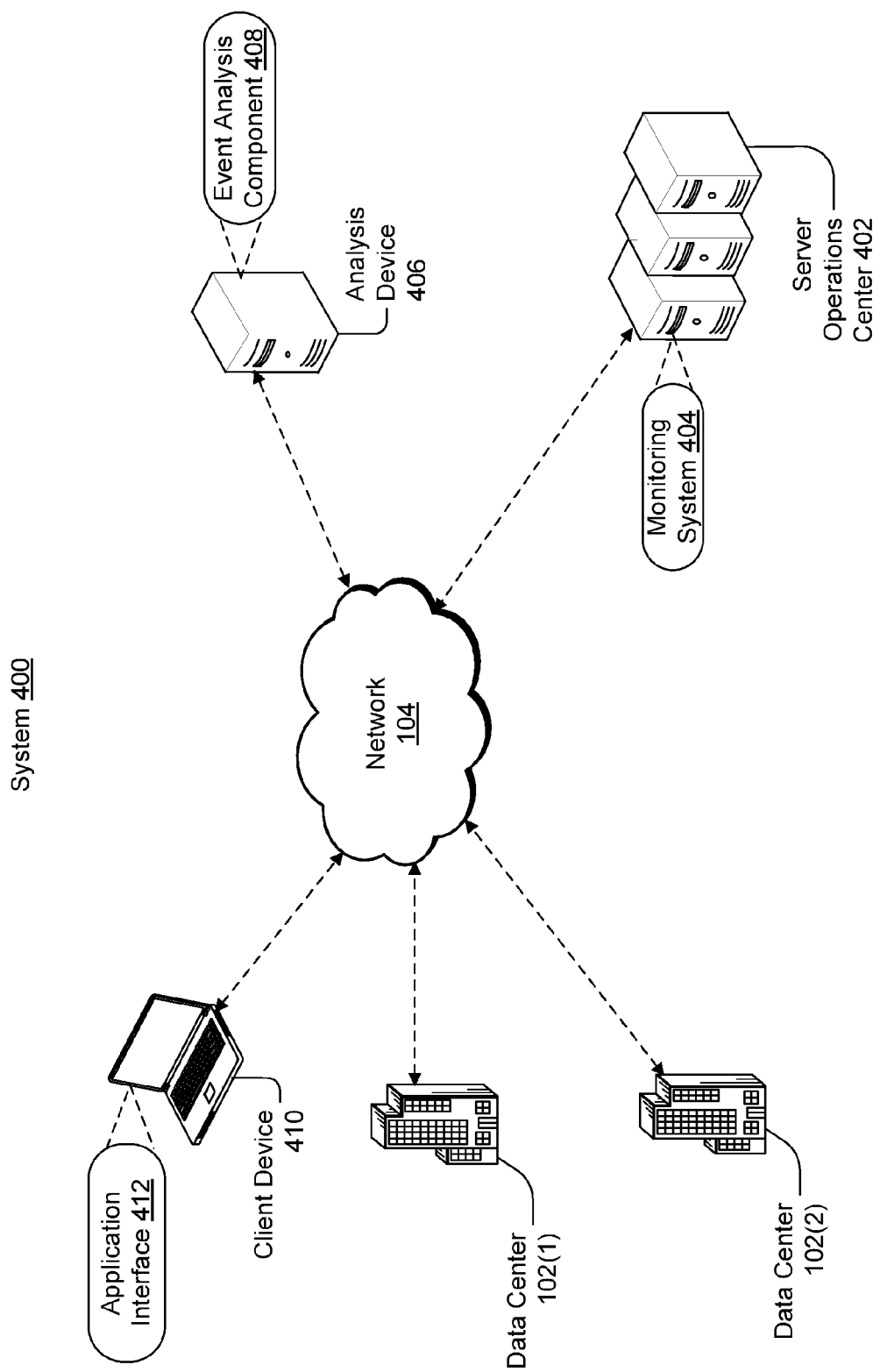
FIG. 4 shows an example system in which the present concepts can be employed.

FIG. 4 shows an exemplary system 400 that is consistent with the disclosed implementations. As shown in FIG. 4, system 400 includes network 104 connecting numerous entities, including a data center 102(1) and a data center 102(2), a server operations center 402 having a monitoring system 404, an analysis device 406 having an event analysis component 408, and a client device 410 having an application interface 412.

Network 104 can include various wired and/or wireless networks and combinations thereof. For example, network 104 can include the public Internet as well as various private networks or portions thereof that connect any of the devices/data centers shown in FIG. 4. For the purposes of the following discussion, it is generally sufficient that network 104 provides connectivity between devices or data centers that share information.

Each data center 102 can be configured as discussed above with respect to any of FIGS. 1-3, or in other suitable configurations. Client device 410 can interact with application 116 by communicating over network 104 with either data center 102(1) or data center 102(2). Application interface 412 can include logic for communicating with application 116, e.g., formatting functionality, display functionality, etc. For example, client device 410 can be employed by an end user that wishes to use various features made available by application 116.

Server operations center 402 can generally include one or more server devices configured to monitor the individual data centers for network problems. For example, monitoring system 404 can execute on the server devices to monitor data centers 102(1) and 102(2). In some implementations, network operators (e.g., network engineers) at server operations center 402 may attempt to resolve issues on either data center, and can track the issues using support tickets, diaries, or other techniques.

Event analysis component 408 of analysis device 406 can be configured to analyze various events in one or more data centers, e.g., to characterize the service level of various applications located at data center 102(1), 102(2), or both. The event analysis component can also be configured to characterize the service level of one or more network devices at one or both data centers. Generally speaking, the event analysis component 408 can be configured to analyze various events as well as support tickets and other data to characterize the service levels of applications and/or devices.

Note that the various devices shown in system 400 are illustrated with respect to logical roles that can be performed by the devices in operation of system 400. However, the geographical locations of the various devices are not necessarily reflected by system 400. For example, data centers 102(1) and/or 102(2) may be collocated with server operations center 402 and/or analysis device 406. As another example, the event analysis component 408 and/or monitoring system 404 can be implemented on one or more devices inside an individual data center, e.g., on one or more of server racks 114.

Furthermore, note that FIG. 4 illustrates server operations center 402 as multiple server devices whereas analysis device 406 and client device 410 are illustrated as individual computing devices. This reflects one particular implementation, and other implementations may provide characterization functionality and/or client functionality as discussed herein via multiple devices. Likewise, server operations center and/or data center functionality as discussed herein may be performed by individual devices.

In addition, functionality described herein with respect to a particular device or devices can be distributed across multiple devices or combined on a single device. For example, monitoring system 404 and event analysis component 408 can be collocated at a server operations center on a single device or multiple devices. As another example, the event analysis component and/or monitoring can be employed on a device at one or both data centers of system 400.

Further note that, in practice, there may be additional instances of each computing device mentioned herein, e.g., additional analysis devices, server operations centers, client devices, and data centers. As discussed in more detail below, each of the computing device(s) shown in FIG. 1 can include one or more processing devices, such as computer processors, executing instructions stored on one or more computer-readable storage media such as volatile or non-volatile memories, optical disks, hard drives, flash drives, etc.

Monitoring System

The monitoring system 404 on server operations center 402 can generally serve to obtain various data relating to the operation of data centers 102(1) and 102(2). The obtained data can be provided to event analysis component 408 for further processing, as discussed in more detail below. For example, the data obtained by the monitoring system can include events, trouble tickets, maintenance data, and traffic data.

With respect to events, the monitoring system can accept event log streams (e.g., from syslog) and can perform functions such as reformatting and filtering event data based on rules and routing messages to any installed rule engines or archival log files. For example, the event logs can be obtained from, and include events generated by, network devices such as core routers 106, access routers 108, aggregation switches 110, and/or ToRs 112 as well as various other network devices (firewalls, load balancers, etc.). The events in the event logs can contain information about what type of network component experienced an event, the event type, the other end-point of this component (e.g., the one-hop directly-connected neighbor), and a short machine-generated description of the event.

The monitoring system 404 on server operations center 402 can also obtain trouble tickets or data related to trouble tickets. For example, network operators may troubleshoot network faults through problem tracking systems or "ticketing" systems that coordinate among network operators working on the problem. Some troubleshooting systems can be built around a Request for Comments memo (e.g., RFC 1297) containing specifications for trouble ticket systems for network operations centers ("NOCs" such as server operations center 402). In such a case, a (possibly unique) identifier herein referred to as NOC TicketID is assigned to each failure event. These tickets contain structured information about when and how an event was discovered and diaries of steps taken by the network operators in troubleshooting and mitigating the problem.

The monitoring system 404 on server operations center 402 can also obtain maintenance data. For example, network operators can use a maintenance tracking and revision control system to track activities that can change the network such as device provisioning, configuration changes, and/or software upgrades throughout the system 400. The maintenance tracking and revision control system can be features of the monitoring system 404 or a separate system. Before debugging an outage, a network operator can check the maintenance tracking system for on-going and planned maintenance. The network operator can use the revision control system to detect any recent changes to the device configuration files. Maintenance data obtained from the maintenance tracking and revision control system can reflect the device provisioning, configuration changes, and/or software upgrades.

The monitoring system 404 on server operations center 402 can also obtain traffic data. For example, traffic carried on network interfaces (links) can be logged using Simple Network Management Protocol ("SNMP") polling that averages traffic seen every five minutes, for example. Other sources of traffic data can be obtained from sampling based approaches such as sFlow. Traffic monitoring systems can use the MIB format to store the data that includes fields such as the interface type (token ring, Ethernet etc.), the other end of the interface, the interface status (up/-down), timestamp, and/or the number of bytes sent or received by the interface, among others.

Using the monitoring system 404 as described above, the server operations center 402 may allow network operators to monitor status of the data centers 102(1) and 102(2) for various failures, e.g., a failed router, improper device configuration, slow response times, etc. Individual events obtained by the monitoring system can be processed to characterize service levels of applications and/or devices as discussed in more detail below.

Event Analysis Component

Event analysis component 408 can utilize event logs obtained by the monitoring system 404 to characterize application and/or device service levels. For instance, additionally or alternatively to the event logs obtained from the monitoring system, the event analysis component can utilize data collected by network operators. For example, network operators can detect faults from network devices and analyze root causes by using monitoring alarms, such as syslog and SNMP traps, and by monitoring device status via ping and SNMP polling. The event analysis component can obtain other device-related data to use in analyzing service levels of both applications and devices, including trouble tickets, maintenance data, and traffic data.

Event analysis component 408 can correlate the above mentioned data with failure events in the event logs to extract failures impacting network traffic and to reverse-engineer the topology information using link-level connectivity as the topology changes from time-to-time. As used herein, a failure can be thought of as an event that causes a device or a link to be unavailable to perform its intended task (e.g., carry traffic). Specifically, a link failure can be thought of as occurring when the connection between two devices is down. Similarly, a device failure can be thought of as occurring when the device is not functioning for routing/forwarding traffic.

Some implementations of event analysis component 408 can filter several types of spurious network events in event logs, such as inaccurate event logs, duplicate events caused by multiple devices reporting the same event, single events being recorded as multiple events, and "shadow" reports (e.g., chatty devices). In regard to inaccurate event logs, syslog messages can be spurious with devices sending multiple notifications that are logged as failure events even though a device is operational. In regards to multiple reporting devices, two or more devices (e.g., neighbors) may send notifications for the same event that are logged as separate events leading to redundant event logs (e.g., multiple redundant error reports). The error reports can be thought of as redundant if subsequent error reports relate to an error that was reported by an earlier error report. Regarding a single event being recorded as multiple events, a flapping device can generate multiple down and up messages which each get logged as different events.

Shadow events can be thought of as events being triggered due to devices which are being scheduled for replacement or have been detected as faulty by operators but which are awaiting repairs. In some cases this effect can be severe with some devices (e.g., "chatty" or "shadow" devices) sending more than a thousand device down notifications over a few hours because the notification system did not suppress them during the troubleshooting window. Techniques that the event analysis component 408 can employ to filter several types of spurious events from network event logs are described in more detail below. The filtered network event logs can be used by the event analysis component to characterize application and/or device service levels as discussed herein.

Specific Event Analysis Component Implementation

Figure 5:
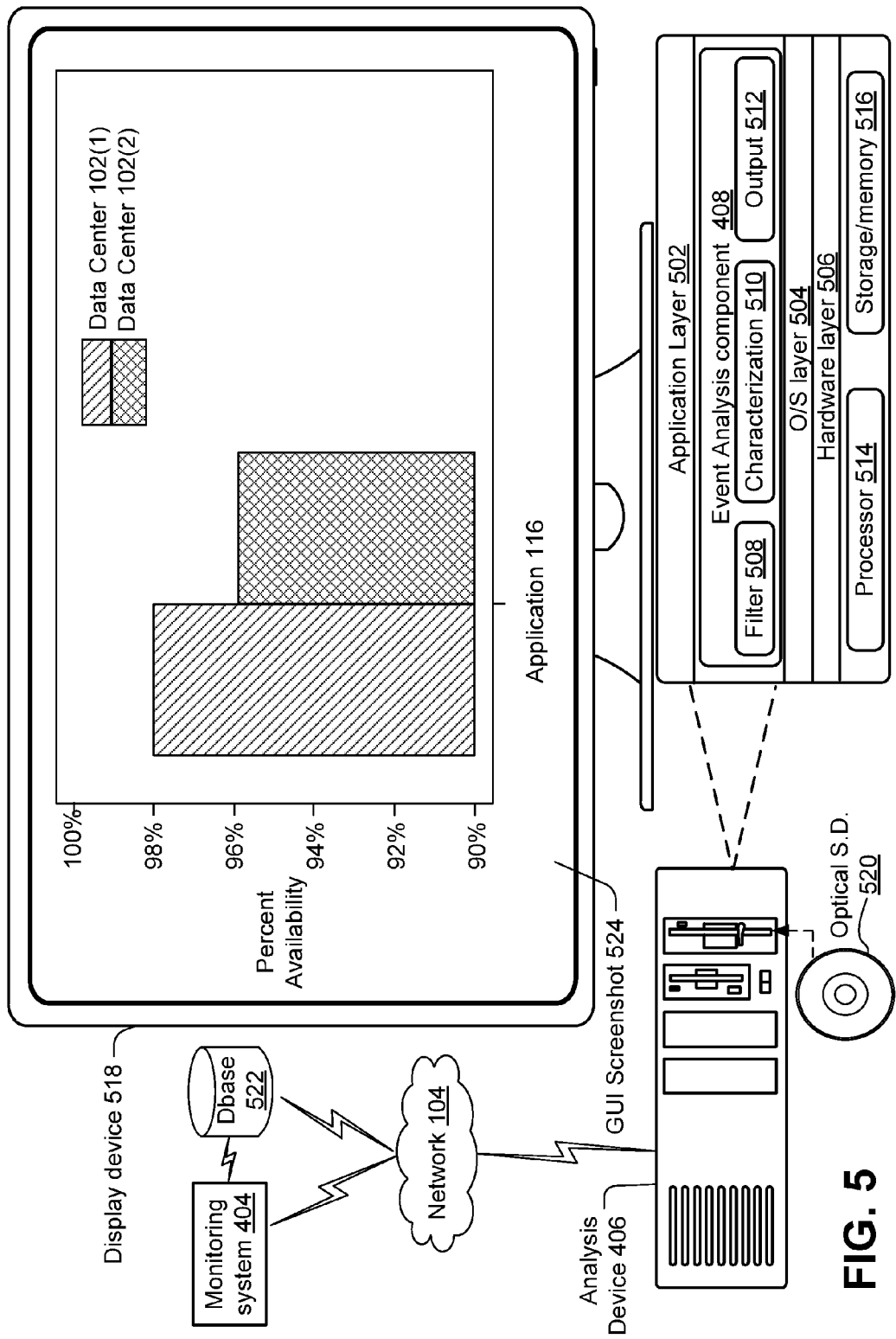
FIG. 5 shows an example computer or computing device that can be configured to accomplish certain concepts in accordance with some implementations.

FIG. 5 shows event analysis component 408 embodied on analysis device 406. The analysis device is one example of a system that can be configured to accomplish certain concepts, as discussed in more detail below. In this case, the analysis device is illustrated as a desktop computer. The terms "computer" or "computing device" are used interchangeably, and as used herein can mean any type of device that has some amount of processing capability. While specific examples of computers are illustrated for purposes of explanation, other examples of such computers can include traditional computing devices, such as personal computers, any of the devices introduced relative to FIGS. 1-4, cell phones, smart phones, personal digital assistants, or any of a myriad of ever-evolving or yet to be developed types of devices. Further, a system can be manifest on a single computing device or distributed over multiple computing devices.

In this case, analysis device 406 can include an application layer 502, an operating system layer 504, and a hardware layer 506. The event analysis component 408 can be manifest as a program or application of the application layer 502, among other configurations. In this example, the event analysis component can include a filter module 508, a characterization module 510, and an output module 512. The event analysis component can process data, such as event logs, provided over network 104 by monitoring system 404. Alternatively, monitoring system 404 can populate a database 522 with event data and the event analysis component can process the event data in the database.

The hardware layer 506 can include a processor 514, storage/memory (e.g., one or more computer-readable storage media) 516, a display device 518, and/or various other elements. For instance, the other elements can include input/output devices, optical disc readers, USB ports, etc.

Processor 514 can execute computer-readable instructions to provide a functionality, such as an event analysis component functionality. Data and/or computer-readable instructions can be stored on storage/memory 516 and/or received from another source, such as optical storage device 520. The storage/memory 516 can include any one or more of volatile or non-volatile memory devices, hard drive storage devices, flash storage devices (e.g., memory sticks or memory cards), and/or optical storage devices (e.g., CDs, DVDs, etc.), among others.

Alternatively to the illustrated configuration of analysis device 406, the computer can employ a system on a chip (SOC) type design. In such a case, functionality provided by the computer can be integrated on a single SOC or multiple coupled SOCs. For instance, the computer can include shared resources and dedicated resources. An interface(s) can facilitate communication between the shared resources and the dedicated resources. As the name implies, dedicated resources can be thought of as including individual portions that are dedicated to achieving specific functionalities. Shared resources can be storage, processing units, etc., that can be used by multiple functionalities.

Generally, any of the functions described herein can be implemented using software, firmware, hardware (e.g., fixed-logic circuitry), manual processing, or a combination of these implementations. The term "engine," "tool," "component," or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable storage/memory devices, such as computer-readable storage media. The features and techniques of the component are platform-independent, meaning that they may be implemented on a variety of commercial computing platforms having a variety of processing configurations.

As used herein, the term "computer-readable media" and "computer-readable medium" can include signals and hardware. In contrast, the terms "computer-readable storage media" and "computer-readable storage medium" exclude pure signals. Computer-readable storage media can include "computer-readable storage devices". Examples of computer-readable storage devices include volatile storage media, such as RAM, and non-volatile storage media, such as hard drives, optical discs, and flash memory, among others.

In some implementations, the filter module 508 can be configured to perform functionality relating to separating duplicate events from a remainder of events in one or more event logs. The filtered events can result in a sub-set of germane events that are used as a dataset for characterizing device or application service levels. The characterization module 510 can be configured to perform functionality relating to characterizing current or future service levels of individual network devices and/or applications at data centers 102(1) and/or 102(2). For example, the characterization module can be configured to characterize the service levels using individual events from the filtered sub-set of events as well as ticket data, maintenance data, and/or traffic data. The characterization module can infer relationships between the ticket data, maintenance data, and/or traffic data and the events based on time of occurrence, date of occurrence, duration of occurrence, physical location, type, property, configuration setup, and/or functional role of the involved devices. The output module 512 can be configured to output results of the characterizing. The output results can include values reflecting the characterized service levels (e.g., a percentage availability of a device or application). The output results can also identify various devices or device groups that tend to fail together, e.g., "risky" devices or device groups.

In the example of FIG. 5, the output module 512 can generate GUI screenshot 524 by obtaining data from monitoring system 404 and/or database 522. As mentioned, database 522 can be populated by the monitoring system and can include events from one or more data centers. Events obtained from, or relating to one or more data centers can be thought of as a dataset that is evaluated by the event analysis component 408. The event analysis component can separate individual events relating to network devices and links connecting these devices from those of other data center devices. The event analysis component can also determine the network stamp of an application, e.g., on a data center-by-data center basis and characterize the service level of the application based on the service levels of individual devices in the network stamp.

The GUI screenshot 524 shown in FIG. 5 can be generated by the event analysis component 408 from the dataset. GUI screenshot 524 illustrates that, at data center 102(1), application 116 has approximately 98% availability. At data center 102(2), application 116 has approximately 96% availability. The event analysis component 408 can infer these percentages using the individual network stamps of application 116 at the individual data centers, as discussed in more detail herein, including the various hypothetical examples. In other words, FIG. 5 illustrates a configuration where the network stamp of application 116 at data center 102(1) has 98% availability whereas the network stamp of application 116 at data center 102(2) has 96% availability.

To summarize, several features that can be offered by the event analysis component 408 are described above and below. These features can include characterizing device and/or application service levels. Another feature, discussed in more detail below, can involve identifying risky redundancy groups, e.g., redundancy groups of one or more devices that tend to fail together instead of individually. A further feature can involve evaluating the effectiveness of redundancy when a redundancy group has multiple devices and also evaluating the effectiveness of redundantly hosting an application at multiple data centers. These features are described in more detail below.

Event Filtering

Figure 6:
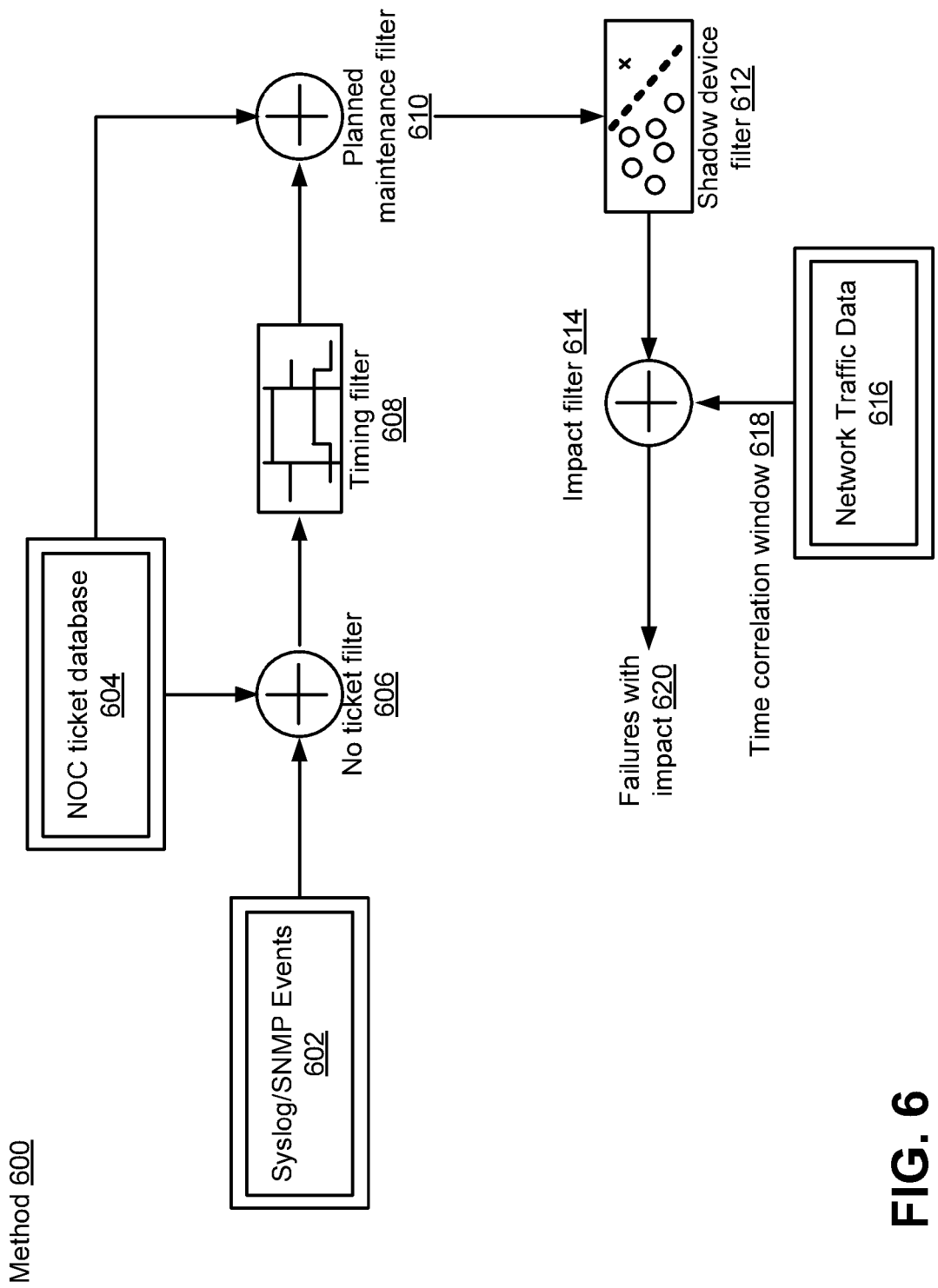
FIGS. 6, 7, and 10 are flowcharts for accomplishing certain concepts in accordance with some implementations.

As mentioned above, some implementations employ filtering of events from event logs to obtain a dataset that can be used to characterize service levels of applications and/or devices. FIG. 6 shows a filtering method 600 for separating a sub-set of germane events from less informative events from a set to obtain a sub-set. This method can utilize events from various sources. In this case, the events can be manifest as Syslog/SNMP events 602 and can be filtered using tickets from a NOC ticket database 604. In this implementation, obtained events that do not have an associated NOC ticket can be removed by a "no ticket" filter at 606. This filter can be based upon the assumption that if an event was not dealt with by an operator, then it is likely that the event did not cause an impact. Thus, filter 606 can filter events based on associated ticket criteria relating to whether the events have associated NOC tickets.

The method can employ a timing filter 608 that filters events using timing-related criteria. The timing filter can be used to fix various timing inconsistencies. In one implementation, the timing filter can first group events with the same start and end time originating on the same interface into a single event. This process can remove duplicate events. Next, the timing filter can pick the earliest start and end times of multiple events that originated within a predefined time window on the same interface. For example, any events that happened within a predefined time of 60 seconds on the same interface can be grouped into a single event (e.g., characterized as a single event). This process can reduce or avoid any problems due to clock synchronization and log buffering. The timing filter can also be used to group two events using interface criteria, e.g., by identifying events that originate on the same interface. For example, events that have the same start time but different end times can be grouped into a single event that is assigned the earlier of the end times. The earliest end times can be utilized since events may not be marked as cleared long after their resolution.

The technique can employ a planned maintenance filter 610 that applies planned maintenance criteria. Events caused by planned maintenance can have less value in understanding device behavior than unplanned events (e.g., unexpected outages). Thus, the planned maintenance filter can remove events that are caused by planned maintenance activities.

The technique can employ a shadow device filter 612. The shadow device filter can apply shadow device criteria to filter events logged by devices that are scheduled for replacement or that have been detected as faulty by operators but are awaiting repairs. The shadow device filter can identify these shadow devices by arranging the devices in the descending order of their number of failures. In one implementation, for a top percentage of the devices in this list, all events are merged that have the same "NOC TicketID" field. This constitutes a merged event reflecting individual events with the same ticket ID that are likely to have the same symptoms. In one case the top percentage is defined as the top five percent, but other values can be employed in other implementations.

The technique can employ an impact filter 614 that applies impact criteria to filter events. An event can be defined as having an impact when the event affects application reliability e.g., throughput loss, number of failed connections or increased latency. In implementations without access to application-level logs, failure impact can be estimated by leveraging network traffic data 616 and computing the ratio of the median traffic on a failed device/link during a failure and its value in the recent past. For example, the value of the recent past can be set as the preceding eight-hour (or other duration) time correlation window 618. Other implementations can use other values. A failure has impact if this ratio is less than one, or another (e.g., lower) threshold on the ratio can be used. The above acts can collectively allow method 600 to identify the failures with impact at 620. Note that other filters can alternatively or additionally be utilized.

Characterizing Application Service Level

Figure 7:
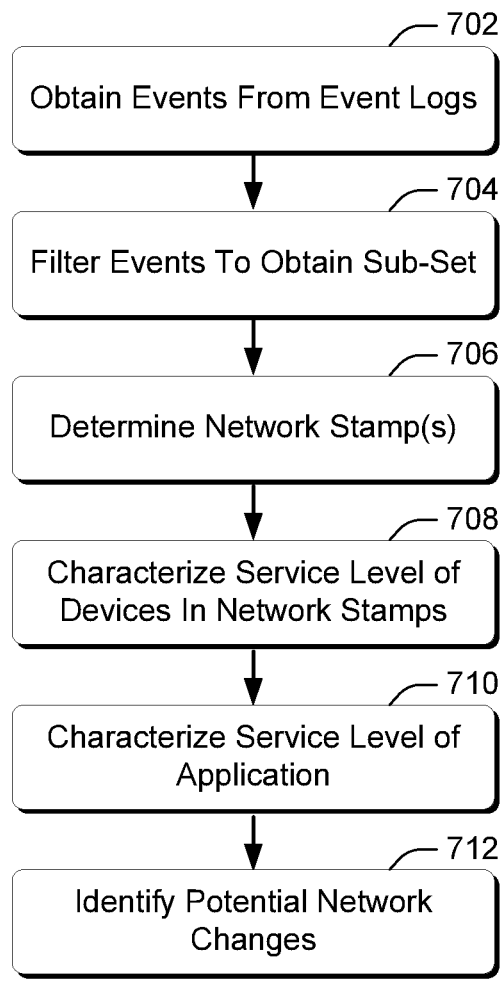

As mentioned above, some implementations may characterize the service level of an application hosted at one or more data centers. FIG. 7 shows a method 700 that can be applied in this context. For example, method 700 can be performed by event analysis component 408 to characterize the service level of an application.

At block 702, the method can obtain a set of events logged at one or more data centers. In one implementation, the set of events can be obtained from a data center monitoring system or from a database that stores the set of events on behalf of the data center monitoring system. The events can reflect failures by one or more network devices in the one or more data centers.

At block 704, the method can filter the events using one or more criteria. For example, the method can separate spurious and duplicate events to obtain a filtered sub-set of the events using method 600. In one implementation, the separating can be accomplished by applying a pipeline of event filters to the set of events to generate the filtered sub-set of the events. In some cases, the pipeline can be created by selecting individual filters from a set of available event filters. The individual event filters may each apply different criteria to filter different events to create the filtered sub-set.

At block 706, the method can determine one or more network stamps of an application. For example, each data center hosting an application can have an individual network stamp. In some cases, block 706 can include processing the filtered sub-set of events to determine the network stamp of the application in the data centers.

At block 708, the method can characterize the service level of one or more network devices in the network stamps. For example, the method can characterize the availability, reliability, and/or traffic loss of an individual access router, aggregation switch, etc. In addition, the method can characterize the service levels of the one or more network devices by characterizing the service level of a redundant group that includes multiple network devices.

At block 710, the service level of the application can be characterized using the service levels of the network devices, e.g., the service levels of individual devices and/or redundant groups of devices in the network stamp(s) where the application is hosted. In implementations where the application is hosted on a single data center, the service level can be the availability of the network stamp at the single data center. In implementations where the application is hosted on multiple data centers, the service level can be a function of availability of the application on each of the multiple data centers. Some implementations may assume statistical independence of the availability of the application on different data centers.

At block 712, the method can identify potential network changes relating to the application or network devices. For example, the method can identify a redundant configuration for the application based on one or more criteria, e.g., hosting the application at multiple data centers, adding a new redundancy group to a given layer of a network stamp, etc. As another example of a network change, the method can identify a suggested change to the ToR connectivity of one or more aggregation switches. In some implementations, the suggested change can be identified to meet a constraint, such as a service level agreement ("SLA") defined metric relating to reliability, availability, traffic loss, etc.

Note also that cost can be used as criteria for identifying potential network changes. For example, cost in terms of currency, time, resources, etc., can be determined for each potential change. For example, hosting an application at a new data center may cost approximately $10,000,000 and be expected to increase network availability of the application from 90% to 99.9%. Merely adding a redundant device to a data center where the device is already hosted may cost approximately $10,000 and be expected to increase network availability of the application from 90% to 99%. Depending on the specific requirements for application availability, either approach may be appropriate.

Further implementations may recommend one or more of the identified potential network changes using a cost-benefit analysis. For example, some implementations may recommend the least expensive potential network change that is expected to meet a given constraint such as an SLA requirement while excluding other potential network changes that are not expected to meet the constraint. Other implementations may rank various potential network changes on a cost-per-unit of availability (or reliability) expected to be obtained by making the respective network changes. A top-ranking subset can be recommended while discarding other, less cost-efficient possible changes. Additionally, some implementations may fix a cost budget and select one or more recommended changes that meet the cost budget. The recommended potential changes can include those changes that meet the cost budget and tend to maximize the expected service level. Other potential changes that do not meet the budget can be excluded from the recommended potential changes.

Network Topology

Note that some implementations may focus the service level of the application from a network-stamp perspective. In other words, such implementations may disregard the consequences of application code failure and/or failure of servers or racks hosting the application, and instead focus on the service levels provided by the network devices used by the application to communicate with other devices outside the data center. However, further implementations may characterize the service level of the application based on both the service level of the network stamp(s) of the application as well as the service levels of the application code and/or hosting servers/racks. The following discussion focuses on characterizing application service levels from a network stamp perspective, e.g., "network service levels."

In some implementations, the network stamp of an application can be determined by considering the connections between the various devices in an individual data center. Considering the example of FIG. 8, which shows an architecture 800 where data center 102 is configured with a second application 802. Note that application 116 is shown as hosted on two server racks 114(1) and 114(2) connected by a single ToR 112(1) through pairs of redundant aggregations switches 110(1), access routers 108(1), and core routers 106. Application 802 is shown as hosted in a similar configuration but with a single aggregation switch 110(2) and a single access router 108(2), also note that application 802 is hosted on racks 114(3) and 114(4) and connected via ToR 112(2).

Figure 8:
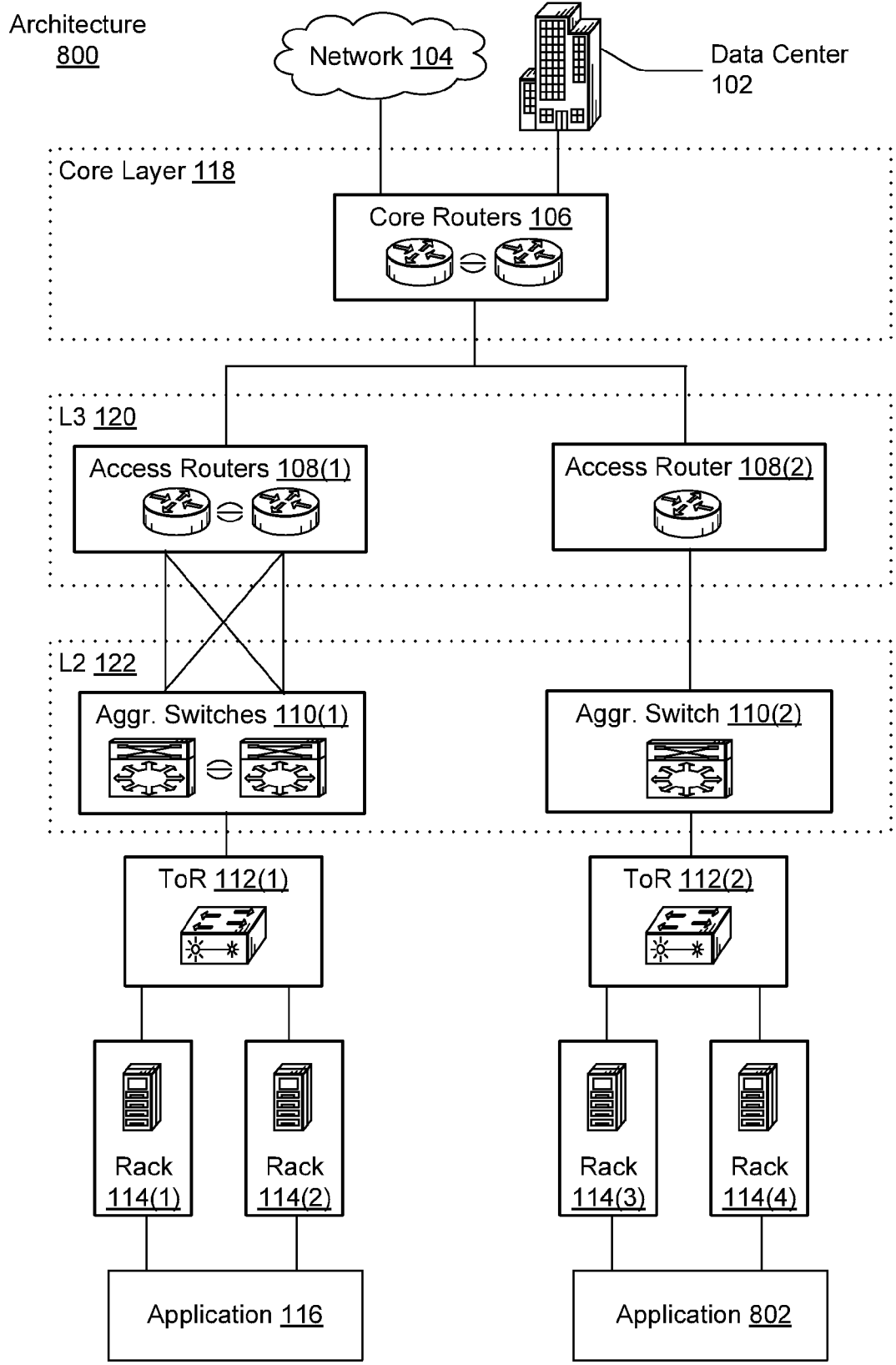

Note also that each application can be viewed as part of a common tree of devices that includes all of the devices in the data center. The individual application network stamps can include devices that are in different subtrees. In FIG. 8, application 116 has a subtree rooted at access routers 108(1) that is distinct from a second subtree rooted at access router 108(2) for application 802. The core routers are typically shared across multiple hosted applications and, therefore, in some implementations the core routers are not considered part of the application-specific network stamp.

In some implementations, a network operator can manually evaluate the physical and/or logical connections of the data center configuration to determine the network stamp of each application. For example, the network operator could identify ToR 112(1), aggregation switch pair 110(1), access router pair 108(1), and core router pair 106 as the network stamp of application 116. Likewise, the network operator could identify ToR 112(2), aggregation switch 110(2), access router 108(2), and core routers 106 as the network stamp of application 802.

In further implementations, application traffic can be leveraged to determine the network stamp of the application. For example, event analysis component 408 can evaluate traffic flows through the data center to determine through which devices application traffic flows (e.g., inbound or outbound network traffic). The event analysis component can also extract redundant device groups from the traffic by identifying individual devices that have common parents or children. For example, the event analysis component can infer from network traffic that individual aggregation switches of aggregation switch pair 110(1) are redundantly paired to ToR 112 (1), because traffic to/from ToR 112(1) passes through both aggregation switches in the pair. As another example, since traffic from both aggregation switches 110(1) passes through both access routers 108(1), the event analysis component can infer that the access routers are redundantly paired with one another. The event analysis component can also infer that, since the network traffic from ToR 112(2) goes through single aggregation switch 110(2) and single access router 108(2), there is no redundancy for single aggregation switch 110(2) or single access router 108(2). Note that failure of a non-redundant device can cause the entire subtree rooted at the failed device to become unavailable due to loss of connectivity.

Some implementations may infer certain naming conventions that convey whether devices are redundantly paired. For example, access router pair 108(1) may include an individual access router named AR1_A and another individual access router named AR1_B. In contrast, individual access router 108(2) may be simply named AR2. In this instance, the naming convention suffix "_A" and "_B" imply two redundant devices that have the common prefix "AR1." Further implementations may infer redundancy by considering both traffic flows and redundancy.

Some implementations may also consider the connectivity of individual ToRs. For example, the service level provided by a given aggregation switch or access router may vary depending on how many ToR switches are connected (indirectly or directly) to the aggregation switch or router. Again, network operators can manually examine physical and/or logical connections in the data center to determine the number of ToRs that are connected to a given aggregation switch, and can also examine the number of ToRs connected to one or more aggregation switches in the subtree rooted at an individual access router. Some implementations may also infer the ToR connectivity or "ToR count" for aggregation switches and/or access routers by analyzing traffic data in a manner similar to that described above for identifying redundancy groups.

Characterization Metrics

Generally speaking, the disclosed implementations can characterize the service level of a device or collectively characterize the service level of a group of redundant devices. Filtered events can be grouped across several dimensions e.g., by individual device, redundancy group, device model, and/ or device type, and metrics can be applied to measure the service levels using the grouped events. Exemplary metrics used to characterize the grouped events can include total outage time, traffic loss, and/or total tickets. The metrics can be computed using the filtered event data from one or more data centers.

In the case of total outage time, the event analysis component can determine the total outage time of an individual device in an additive fashion, e.g., summing the individual outage minutes for each event in the filtered data set. One example of a service level, availability, can be computed based on the total uptime of a particular device over a period, such as a year. Note that this is also true of redundancy groups, e.g., the availability of a redundancy group can be calculated without calculating the availability of individual group members by considering the total outage time of the redundancy group as a whole. This can also be done for device types, e.g., the average availability of access routers as a whole can be computed based on the total uptime of multiple (e.g., all) devices of a particular type. Similar processing can be performed for individual device models (e.g., a brand X model Y access router), the average availability of the model can be computed as the total outage minutes for all of the devices of that particular model divided by the total expected operational time of all of the devices of that particular model.

In the case of traffic loss, several equations can be used. The estimated average of median traffic loss per event for a device can be defined as:

$$\frac{\sum_{\forall\ events} \left( \frac{(\text{traffic} \cdot \text{before}_{median} - \text{traffic} \cdot \text{after}_{median}) *}{\text{Failure Duration}} \right)}{\text{Total Events Contributed By Device}}$$

Here, the equation implies that the estimated average of median traffic loss of a given device per event can be represented by the sum, over all events, of the difference in median network traffic before and after an event multiplied by the duration of the failure, divided by the total events contributed by the device to normalize the loss on a per-event basis. To obtain this value, the median traffic before and after each event can be computed to determine the median traffic loss, and then the median traffic loss can be averaged for a given event. Note that, in this context, the term "event" can refer to any individual failure episode, and can refer to a single or multiple individual device and/or link failures that collectively relate to the event.

The estimated median traffic loss for a given device per day can be defined as:

$$\sum_{\forall\ events\ \in d} \left( \left( \left( \begin{array}{c} \text{traffic} \cdot \text{before}_{median} - \\ \text{traffic} \cdot \text{after}_{median} \end{array} \right) \right) * \text{Failure Duration} \right)$$

Here, the equation implies that the loss for the device in a day is the sum, for each event associated with that device on that day, of the difference in median traffic before and after the event multiplied by the duration of the failure. Note also that traffic flow can be aggregated (e.g., summed) across links or devices in a redundant group.

For a given device model, the percentage of traffic lost by that device model can be computed as:

$$\frac{\text{Traffic Lost}}{\text{Traffic Carried}} * 100 = \frac{\text{Traffic Lost}}{\text{Throughput} * \text{Time}} * 100$$

where throughput is packets per second or bytes per second and Time is the total duration over which the calculation is performed.

In the case of total tickets, the number of total tickets for a given individual device, redundancy group, device type, or device model can be computed in a relatively straightforward fashion from the filtered events. For example, each filtered event can identify a single failed device or multiple failed devices (e.g., for merged events). The number of tickets (e.g., unique tickets) for that particular device can be computed in an additive fashion. Similarly, for a redundancy group, the number of tickets identifying at least one device from the group can be computed in an additive fashion. For a device type (e.g., access router) the number of tickets identifying any access router can be computed in an additive fashion. For a device model, (e.g., brand X model Y access router), the number of tickets identifying a particular model can be computed in an additive fashion. This concept is readily extensible to other concepts related to service levels, e.g., total downtime for a platform or group of devices can be another appropriate metric.

Using the above metrics, device service levels can be characterized and the service level of an application can be computed using the service levels of the individual devices/redundancy groups in the network stamp(s) of the application. Further implementations may consider other network configuration aspects, e.g., device properties, connectivity, etc.

Device properties for a network device can reflect configuration parameters, software or firmware revisions, the particular application that is communicating through the device, etc. Some implementations can calculate individual metrics on a property-by-property basis to capture how different device properties may influence service levels. For example, the availability of access routers having a particular model with a particular software/firmware revision can be determined. As another example, the availability of aggregation switches used to route traffic from a search application can be determined, and may be different than the availability of similarly-configured aggregation switches that route traffic for a different application (e.g., cloud storage).

Some implementations may also consider device connectivity or capacity and determine the aforementioned metrics for different levels of connectivity. For example, assume up to 80 ToR switches can be connected to a single aggregation switch. Some implementations may characterize the traffic loss of an aggregation switch based on the number of connected ToRs. To the extent the ToR connectivity influences the traffic loss of the aggregation switch, such implementations may uncover this relationship. This can also be the case at other layers, e.g., the number of aggregation switches connected to a given access router can be considered as well. Also note that this processing can be performed across multiple layers, e.g., some implementations may characterize service levels of access routers based on the total number of connected ToRs in the subtrees rooted at the access routers.

Numerical Examples

Referring back to FIG. 8, the following will introduce some simple numerical examples to elaborate on the concepts expressed above. As with the previous hypotheticals, unless otherwise indicated, assume all devices shown in FIG. 8 exhibit 100% availability. Considering application 802, note that a failure at either aggregation switch 110(2) or access router 108(2) causes the entire subtree rooted at the failing device to lose connectivity. For the purpose of this hypothetical, assume the access router 108(2) has 90% availability. Thus, the availability of application 802 in this instance is computed as 90%, since the only point of failure has 90% availability.

Now, consider application 116 and again assume only the access routers have any failures and have availability of 90%, or the probability of a failure at any given time is 10%. Since access routers 108(1) are employed in a redundant group, assuming statistical independence, the probability of a co-occurrence of failures is $(0.1)^n$, where n is the number of redundant devices in the group. In the example shown, there are two devices, so the probability of both devices failing is 0.01. Thus, deploying the access routers in a redundant pair results in 99% availability.

Given the above, one way to use ticket counts is to represent devices or device families (e.g., a particular model number) using an ordered tuple <availability, ticket count, traffic loss>. For device families, the ticket counts can be aggregated for each individual device from a given family. The tuples can be compared using lexicographic ordering e.g., if availabilities are the same or similar, then the device family with the lower ticket count is preferred because it implies that the number of impactful failures is smaller. Similarly, the traffic loss can be used for comparison—relatively small loss is preferred over device families (platforms) which cause high traffic loss during outages. Conversely, device families with high ticket counts and/or traffic loss can be considered "risky" device families. These risky families can be identified by lexicographically ordering device families based on ticket count/traffic loss and selecting the device families with high ticket counts/traffic loss. Risky device families can also be identified by applying thresholds to ticket counts/traffic loss, e.g., device families having greater than a threshold ticket frequency or greater than a threshold percentage traffic loss can be considered risky. Similar analyses can be performed using other metrics, e.g., device failure rates, etc.

The previous examples illustrate how the event analysis component can characterize the service level of an existing network configuration. The event analysis component can also estimate the service level of a proposed configuration reflecting one or more changes to the network. For example, assume a configuration change is contemplated to remove a single router from access router pair 108(1). In this case, the event analysis component could estimate the availability of application 116, after the configuration change, as 90% (e.g., n=1). Alternatively, the event analysis component can estimate the availability of application 116 if another access router were added as 99.9% (e.g., n=3). Further implementations may account for the extent to which access router failures may be correlated (e.g, simultaneous, at least partially overlapping, or in temporal succession).

Note that this analysis can also extend to different devices or data centers, e.g., assume application 802 is hosted on a single data center with 90% availability. A potential network change could be to host application 802 on 3 identical data centers, each providing 90% availability. Assuming statistical independence of the data centers, the estimated availability of application 802 would be 99.9% if this change were made. Alternatively, if the individual data centers provide different estimated availability and are assumed to be statistically independent, the individual network stamps of the application at each data center can be evaluated independently and multiplied to obtain an estimated availability. This is the case provided the individual data centers have enough capacity to handle the full application traffic load when other data centers are unavailable.

In some implementations, the event analysis component can identify various network changes that can meet a particular constraint. One type of constraint is defined by a Service Level Agreement ("SLA"). For example, the operator of the data center may be contractually obligated to provide 99.8% availability for application 116. Recall that, in the example of FIG. 8, application 116 has 99% availability at a single point of failure, the redundant pair of access routers 108(1). In this example, the event analysis component could identify hosting application 116 at an additional data center as one potential change, because two data centers with 99% individual availability would be expected to provide 99.99% availability. Alternatively, the event analysis component could identify configuring a third access router with the pair of access routers 108(1) in a redundant configuration as another potential change that would meet the SLA-required availability for application 802. This is the case since each individual access router is expected to provide 90% availability, resulting in an expected availability of 99.9% (assuming statistical independence).

Figure 9:
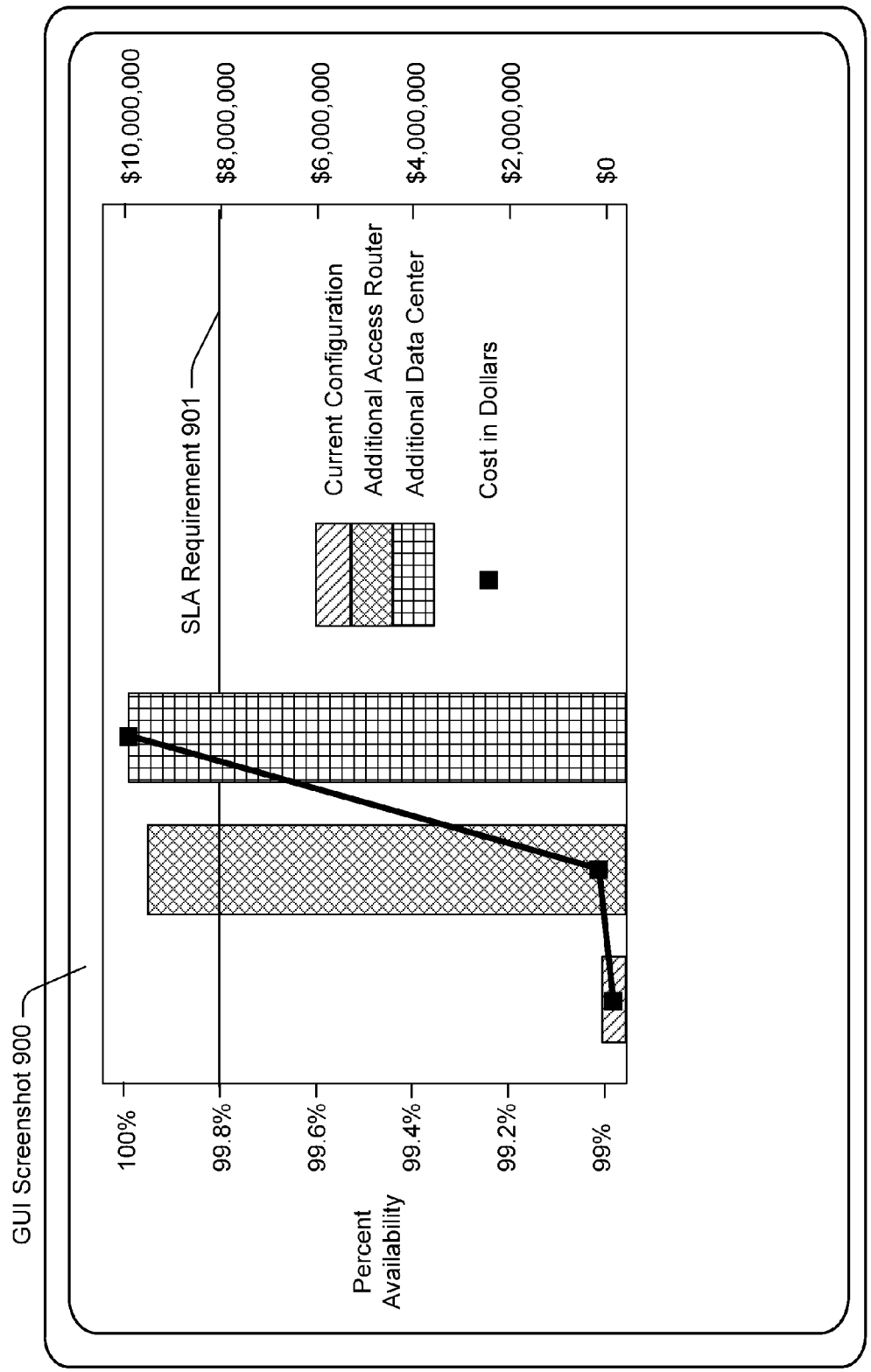
FIGS. 9 and 11 show screenshots of graphical user interfaces that can be generated relative to certain concepts in accordance with some implementations.

FIG. 9 illustrates another GUI screenshot 900 that can be generated by the output component 512 of event analysis component 408. GUI screenshot 900 illustrates availability of application 116 in a current configuration at 99%, as well as availability of application 116 in the potential configuration with an additional access router as 99.9% and at an additional data center as 99.99%. GUI screenshot 900 also includes an SLA requirement 901, illustrated as a line reflecting the level of network availability defined by the SLA. Thus, a user viewing GUI screenshot 900 can see that, while the current configuration does not meet the SLA, the addition of a redundant access router to access router pair 108(1) will enable the network stamp of application 116 to meet the SLA, as would hosting the application at another identical data center.

Some implementations may also convey costs associated with the various potential configuration changes, e.g., adding currency, hourly, or other resource costs to GUI screenshot 900 for each potential change, e.g., on a secondary Y axis, textual representation, pie chart, etc. Some implementations may also represent the costs on a per-unit of availability basis, e.g., 1 additional "9" of availability (from 90% to 99%, 99% to 99.9%, etc.) is expected to cost a certain amount of resources. For example, FIG. 9 shows the cost in dollars for adding an additional data center is far higher than the cost to add an additional access router. In this instance, it may be appropriate to add the additional access router rather than add another data center, because both proposed configurations meet the SLA requirement and adding the access router is far cheaper.

Also note that some potential network changes may consider connectivity. For example, assume a different hypothetical where all of the devices except the aggregation switches exhibit 100% availability, and the availability of the aggregation switches varies with ToR connectivity. Specifically, consider an example where aggregation switches connected to 50 or fewer ToRs exhibit 90% availability and aggregation switches connected to 51 or more ToRs exhibit 80% availability. Now, assume that the network stamp of application 802 includes a total of 80 ToRs and two non-redundant aggregation switches, the first of which has 60 connected ToRs and the second of which has 20 connected ToRs. In this example, the event analysis component can compute estimated availability of 80% for the first aggregation switch and 90% for the second aggregation switch. Assuming statistical independence, the estimated availability for the subtree is 98% in this configuration. The event analysis component 408 can identify a potential change to move at least 10 of the connected ToRs over to the second aggregation switch, since this would not change the estimated availability of the second aggregation switch and would increase the estimated availability of the first aggregation switch to 90%, for a subtree with an estimated 99% availability. This is the case provided there remains sufficient capacity in place for any application from which the ToRs are moved.

Risky Devices

In the hypothetical examples discussed above, statistical independence between failures in various devices was assumed to allow for relatively simple exemplary computations. In practice, some devices may exhibit some statistical correlation in their failures. For example, a pair of redundant access routers may tend to fail together due to problems common to both of the access routers. For example, both access routers may have a bug in the software/firmware, power outages or spikes could cause both routers to fail, overload conditions could affect both routers concurrently, etc. However, note that highly correlated failures can be undesirable, particularly for redundant devices. This is because, as discussed above, when redundant devices in a group fail together, they are not available to take over functioning for each other.

Figure 10:
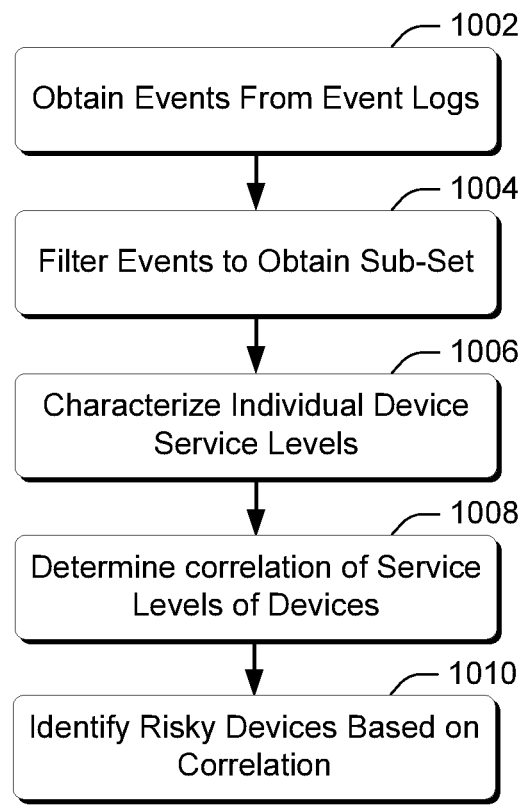

In view of the above, some implementations may identify certain groups of risky devices in a given network configuration. FIG. 10 shows a method 1000. For example, method 1000 can be performed by event analysis component 408 to characterize groups of devices as "risky," meaning the devices are relatively likely to fail together rather than individually.

At block 1002, the method can obtain a set of events logged at a data center. Block 1002 can be similar to block 702 of method 700.

At block 1004, the method can method can filter the events using one or more criteria. Block 1004 can be similar to block 704 of method 700.

At block 1006, the method can characterize service levels of one or more devices using the filtered sub-set of the events. For example, the method can determine the individual availability of multiple access routers in a redundancy group at the L3 aggregation layer, or multiple aggregation switches at the L2 aggregation layer.

At block 1008, the method can determine correlations between the service levels of the individual devices. For example, some implementations may compute the correlation (e.g., Pearson correlation) between tickets, outage minutes, or traffic loss for devices within an individual redundancy group. Some implementations may also compute the correlation between tickets, outage minutes, or traffic loss of connected devices at different layers, e.g., between an individual aggregation switch and an individual access router.

At block 1010, the method can identify risky devices based on the correlations. For example, the correlations can be compared to a threshold, and devices having a correlation exceeding the threshold can be identified as risky because these devices may tend to fail together (e.g., failures with a temporal relationship such as overlapping failures or tending to fail in succession). As one example, access routers or aggregation switches in a redundancy group that tend to fail together can be risky because the redundancy is less effective when the devices tend to fail together. As another example, failures of a device at one layer can tend to cause failures of devices at other layers, e.g., failed ToRs can tend to bring down upstream aggregation switches and this can be apparent from the correlations. Note also that individual devices that tend to fail frequently can also be identified at block 1010 (e.g., devices with a high number of failures).

The service levels used for method 1000 can include the various service levels mentioned above, e.g., total outage time, total tickets, traffic loss, etc. Note, however, that other metrics may be suitable. Furthermore, while the following implementations discuss Pearson correlation as a suitable measure of correlation, other correlation measures can also be used such as Spearman's rank correlation coefficient and/or Kendall tau rank correlation coefficient.

Considering total outage time, one way to correlate outage time between two devices is as follows. First, the total downtime of a device A and the total downtime of a device B are determined from filtered events, as discussed above. Next, the filtered events are also used to determine individual events where both device A and B were down together, or at least partially overlapping in terms of their time window of being unavailable. If there is a strong negative correlation between failures of devices A and B (e.g., Pearson coefficient close to −1), then the overlapping failures will tend to be relatively minimal relative to the individual failure rates of the devices—in other words, the devices are less likely to fail together than would be the case if there were no correlation. If there is minimal or no correlation (e.g., Pearson coefficient of approximately 0), then the devices tend to fail independently of one another, e.g., the failure of one device has little or no apparent impact on whether the other device fails. If there is a strong correlation (e.g., Pearson coefficient close to 1), there is a strong correlation and the devices are more likely to fail together than would be the case if the failures were independent.

This last case, relatively high correlation, can be problematic for devices in a redundant configuration for reasons already mentioned. Thus, in some implementations, risky devices can be devices deployed in a redundant configuration that have a correlation exceeding a certain threshold, e.g., 0.7. Similar processing can be employed with respect to network tickets by determining the Pearson coefficient for support tickets, e.g., determining the total number of tickets for each individual device and the intersection of these tickets that relate to both devices. Assuming an equivalent number of tickets, smaller intersections imply lower correlations and larger intersections imply higher correlations. Correlations can also be determined for losses of network traffic by individual devices, e.g., if traffic loss by one device in a redundant pair tends to be highly correlated to traffic loss by another device in the redundant pair, the pair can be flagged as a risky device pair.

Figure 11:
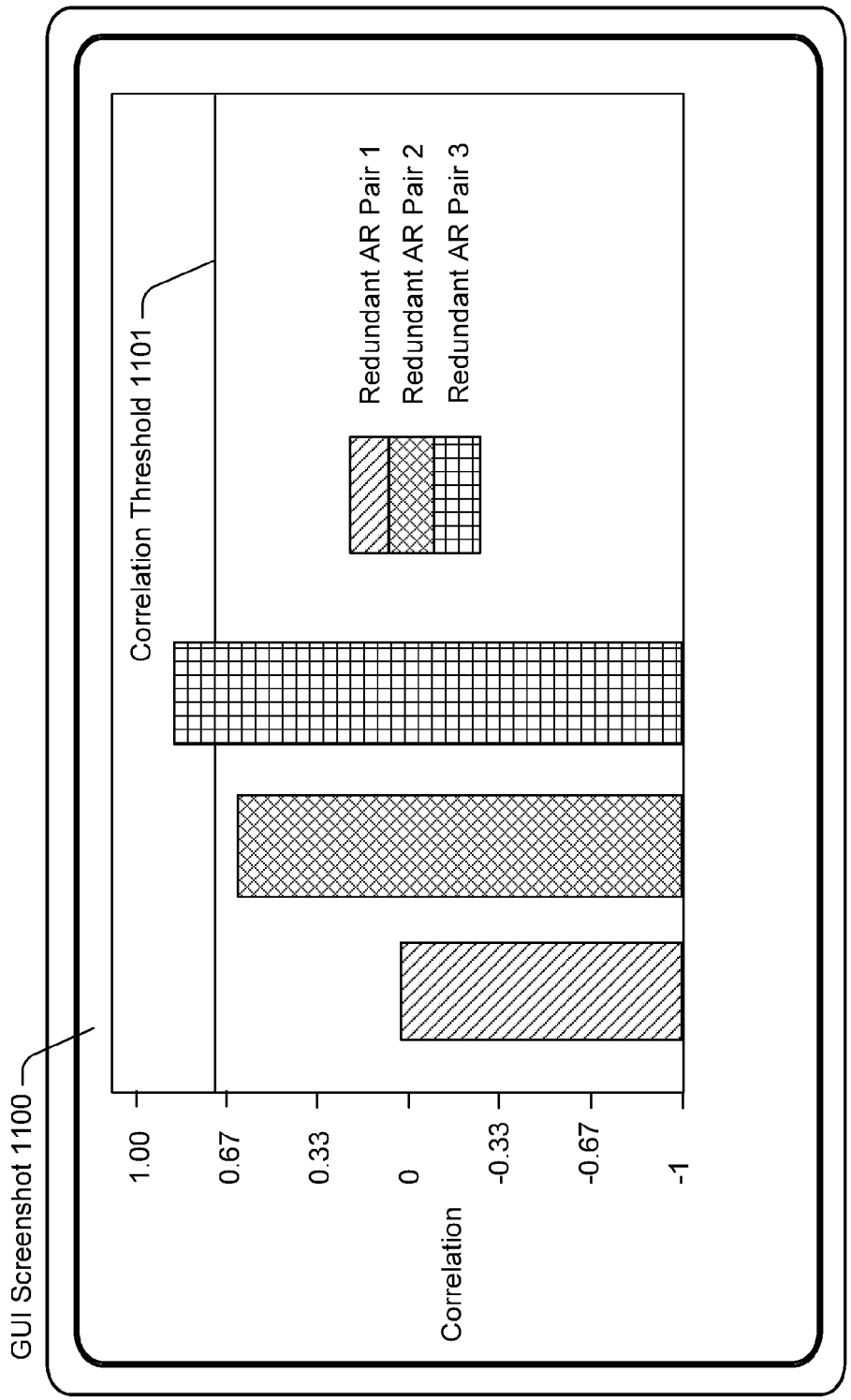

FIG. 11 illustrates another GUI screenshot 1100 that can be generated by the output component 512 of event analysis component 408. GUI screenshot 1100 shows correlations for three redundant access router pairs ("AR pairs"). GUI screenshot 1100 also shows a correlation threshold 1101, which is shown as a line representing the threshold for characterizing an individual device group as "risky." Thus, GUI screenshot 1100 shows that redundant AR pair 3 is risky because the correlation exceeds the threshold. In some implementations, GUI screenshot 1100 may allow user inputs to move the correlation threshold 1001 up or down and recharacterize device groups accordingly. For example, if the user moved the threshold down to 0.53, then redundant AR pair 2 would also be characterized as a risky AR pair.

Note that some implementations may perform processing similar to that discussed above with respect to method 1000 to determine risky device properties. For example, consider a data center with many physically identical network devices, a first group of which have a first software/firmware revision, Revision A and a second group of which have a second software/firmware revision, Revision B. One device property for these devices may reflect the current revision. If Revision A is highly correlated (e.g., using one or more of the correlation measures mentioned above) to tickets, outages, or traffic loss, then this property can be flagged as a risky property. In further implementations, the event analysis component may evaluate the data center topology to identify those devices having the risky property (e.g., Revision A). The event analysis component may also estimate the change in device availability if the Revision A devices were upgraded to revision B. Based on the estimated individual device availability, the event analysis component can also estimate the change in application availability for applications having network stamps that include one or more Revision A devices.

CONCLUSION

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to characterizing service levels are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by a computing device, the method comprising:
   obtaining events from an event log, the events reflecting failures by a plurality of network devices;
   filtering the events using one or more criteria to obtain a sub-set of the events;
   evaluating traffic flows through the plurality of network devices to identify specific network devices that carry application traffic for an application, the specific network devices being included within a network stamp of the application and including a group of redundantly-configured network devices;
   characterizing network device service levels of the specific network devices included in the network stamp using the sub-set of the events;
   characterizing an application service level of the application based on the network device service levels of the specific network devices in the network stamp of the application; and
   outputting the application service level via an output device of the computing device.

2. The method according to claim 1, further comprising:
   processing individual events from the sub-set of the events to determine the network stamp of the application.

3. The method according to claim 1, wherein the one or more criteria comprise associated ticket criteria, timing-related criteria, planned maintenance criteria, shadow device criteria, or impact criteria.

4. The method according to claim 1, wherein the characterizing the application service level of the application assumes statistical independence of failures of at least two of the specific network devices included in the network stamp of the application.

5. The method according to claim 1, further comprising:
identifying one or more potential network changes relating to the application or the network stamp.

6. The method according to claim 5, wherein an individual potential network change relates to changing redundancy in the network stamp.

7. The method according to claim 5, wherein an individual potential network change relates to changing a number of data centers at which the application is hosted.

8. The method according to claim 1, wherein the outputting comprises displaying the application service level on a display device via a graphical user interface (GUI).

9. The method according to claim 1, wherein the application service level reflects at least one of network availability, network reliability, or traffic flow.

10. The method according to claim 1, wherein the group includes two or more redundantly-configured access routers and the network stamp also includes a second group of two or more redundantly-configured aggregation switches.

11. The method according to claim 1, wherein the application service level is characterized for an existing network configuration of an individual data center or a proposed configuration of the individual data center.

12. A system comprising:
a hardware processor; and
hardware storage media storing an event analysis component executable by the hardware processor, wherein the event analysis component is configured to:
obtain events from an event log, the events reflecting failures by a plurality of network devices;
filter the events using one or more criteria to obtain a sub-set of the events;
evaluate traffic flows through the plurality of network devices to identify specific network devices that carry application traffic for an application, the specific network devices being included within a network stamp of the application and including a group of redundantly-configured network devices;
characterize network device service levels of the specific network devices included in the network stamp using the sub-set of the events;
characterize an application service level of the application based on the network device service levels of the specific network devices in the network stamp of the application; and
output the application service level via an output device.

13. The system of claim 12, wherein the group of redundantly-configured network devices includes two routers within a particular aggregation layer of the network stamp.

14. The system of claim 13, wherein the particular aggregation layer performs trunking or virtual local area network functionality.

15. The system of claim 13, wherein the particular aggregation layer aggregates network traffic, including the application traffic, from multiple servers and routes the network traffic to one or more core routers.

16. A system comprising:
a hardware processor;
an output device; and
hardware storage media storing computer-readable instructions which, when executed by the hardware processor, cause the hardware processor to:
obtain events from an event log, the events reflecting failures by a plurality of network devices;
filter the events using one or more criteria to obtain a sub-set of the events;
evaluate traffic flows through the plurality of network devices to identify specific network devices that carry application traffic for an application, the specific network devices being included within a network stamp of the application and including a group of redundantly-configured network devices;
characterize network device service levels of the specific network devices included in the network stamp using the sub-set of the events;
characterize an application service level of the application based on the network device service levels of the specific network devices in the network stamp of the application; and
output a characterization of the application service level via the output device.

17. The system of claim 16, wherein the computer-readable instructions, when executed by the hardware processor, cause the hardware processor to:
determine an extent to which failures of individual redundantly-configured network devices in the group are correlated,
wherein the application service level is characterized based on the extent to which the failures of the individual redundantly-configured network devices in the group are correlated.

18. The system of claim 16, wherein the network stamp includes another group of redundantly-configured network devices.

19. The system of claim 18, wherein the computer-readable instructions, when executed by the hardware processor, cause the hardware processor to:
determine a extent to which failures of the group and the another group tend to co-occur,
wherein the application service level is characterized based on the extent to which the failures of the group and the another group tend to co-occur.

20. The system of claim 19, wherein the group and the another group are located in different layers of a network hierarchy of the network stamp and the application traffic flows from the group to the another group.

* * * * *